United States Patent
George et al.

(10) Patent No.: US 7,288,014 B1
(45) Date of Patent: Oct. 30, 2007

(54) DESIGN, FABRICATION, TESTING, AND CONDITIONING OF MICRO-COMPONENTS FOR USE IN A LIGHT-EMITTING PANEL

(75) Inventors: Edward Victor George, Temecula, CA (US); Newell Convers Wyeth, Oakton, VA (US); Albert Myron Green, Springfield, VA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 10/756,266

(22) Filed: Jan. 14, 2004

Related U.S. Application Data

(63) Continuation-in-part of application No. 10/214,768, filed on Aug. 9, 2002, now Pat. No. 6,822,626, which is a continuation-in-part of application No. 09/697,358, filed on Oct. 27, 2000, now Pat. No. 6,762,566.

(51) Int. Cl.
 *H01B 17/49* (2006.01)
(52) U.S. Cl. .................. 445/24; 313/582; 438/30
(58) Field of Classification Search ............. 313/582; 445/24; 438/30
 See application file for complete search history.

(56) References Cited

U.S. PATENT DOCUMENTS

| | | | |
|---|---|---|---|
| 3,559,190 A | 1/1971 | Blitzer et al. ............. 340/173 |
| 3,646,384 A | 2/1972 | Lay .......................... 313/109.5 |
| 3,704,052 A | 11/1972 | Coleman .................... 316/17 |
| 3,755,027 A | 8/1973 | Gilsing ........................ 156/67 |
| 3,848,248 A | 11/1974 | MacIntyre, Jr. ......... 340/324 M |
| 3,969,651 A | 7/1976 | Greeson, Jr. ............ 315/169 TV |
| 3,990,068 A | 11/1976 | Mayer et al. ............ 340/324 M |
| 3,998,618 A | 12/1976 | Kreick et al. ................. 65/105 |
| 4,027,246 A | 5/1977 | Caccoma et al. ......... 235/151.1 |
| 4,035,690 A | 7/1977 | Roeber ................... 315/169 TV |
| 4,303,433 A | 12/1981 | Torobin ..................... 65/21.4 |
| 4,379,301 A | 4/1983 | Fischbeck ................... 346/1.1 |
| 4,386,358 A | 5/1983 | Fischbeck ................... 346/1.1 |
| 4,393,326 A | 7/1983 | Kamegaya et al. .......... 313/582 |
| 4,429,303 A | 1/1984 | Aboelfotoh ................. 340/701 |
| 4,534,743 A | 8/1985 | D'Onofrio et al. .......... 445/24 |
| 4,554,537 A | 11/1985 | Dick ............................ 340/775 |
| 4,563,617 A | 1/1986 | Davidson ..................... 315/312 |
| 4,591,847 A | 5/1986 | Criscimagna et al. ....... 340/776 |
| 4,654,561 A | 3/1987 | Shelton ................... 315/111.71 |
| 4,658,269 A | 4/1987 | Rezanka ....................... 346/75 |
| 4,697,123 A | 9/1987 | Shinoda et al. .......... 315/169.4 |
| 4,728,864 A | 3/1988 | Dick ........................ 315/169.3 |
| 4,833,463 A | 5/1989 | Dick et al. ................... 340/775 |
| 4,843,281 A | 6/1989 | Mendelsohn ................ 313/587 |

(Continued)

OTHER PUBLICATIONS

International Search Report for Application No. PCT/US01/42803, dated Dec. 9, 2002 (mailing date).
Preliminary Examination Report for Application No. PCT/US01/42803, dated Sep. 22, 2003 (mailing date).

*Primary Examiner*—Laura M. Schillinger
(74) *Attorney, Agent, or Firm*—Kilpatrick Stockton LLP

(57) ABSTRACT

A method of forming micro-components is disclosed. The method includes pretesting and conditioning of the micro-components. The micro-components that fail testing or conditioning are discarded, and those remaining are assembled into a panel.

8 Claims, 15 Drawing Sheets

U.S. PATENT DOCUMENTS

| | | | |
|---|---|---|---|
| 4,887,003 A | 12/1989 | Parker | 313/634 |
| 4,912,364 A | 3/1990 | Holló et al. | 313/623 |
| 5,019,807 A | 5/1991 | Stapleton et al. | 340/718 |
| 5,030,888 A | 7/1991 | Salavin et al. | 315/169.4 |
| 5,062,916 A | 11/1991 | Aufderheide et al. | 156/269 |
| 5,068,916 A | 11/1991 | Harrison et al. | 455/39 |
| 5,075,597 A | 12/1991 | Deschamps et al. | 315/169.4 |
| 5,126,632 A | 6/1992 | Parker | 313/634 |
| 5,150,007 A | 9/1992 | Andreadakis | 313/586 |
| 5,194,027 A | 3/1993 | Kruskopf et al. | 445/24 |
| 5,315,129 A | 5/1994 | Forrest et al. | 257/21 |
| 5,396,149 A | 3/1995 | Kwon | 313/486 |
| 5,500,287 A | 3/1996 | Henderson | 428/403 |
| 5,501,871 A | 3/1996 | Henderson | 427/160 |
| 5,510,678 A | 4/1996 | Sakai et al. | 315/58 |
| 5,514,934 A | 5/1996 | Matsumoto et al. | 313/607 |
| 5,674,351 A | 10/1997 | Lovoi | 156/629.1 |
| 5,675,212 A | 10/1997 | Schmid et al. | 313/422 |
| 5,686,790 A | 11/1997 | Curtin et al. | 313/493 |
| 5,703,436 A | 12/1997 | Forrest et al. | 313/506 |
| 5,707,745 A | 1/1998 | Forrest et al. | 428/432 |
| 5,721,160 A | 2/1998 | Forrest et al. | 438/28 |
| 5,725,787 A | 3/1998 | Curtin et al. | 216/25 |
| 5,746,635 A | 5/1998 | Spindt et al. | 445/24 |
| 5,747,931 A | 5/1998 | Riddle et al. | 313/581 |
| 5,755,944 A | 5/1998 | Haven et al. | 204/486 |
| 5,757,026 A | 5/1998 | Forrest et al. | 257/40 |
| 5,757,131 A | 5/1998 | Tsuchiya | 375/582 |
| 5,757,139 A | 5/1998 | Forrest et al. | 315/169.3 |
| 5,777,782 A | 7/1998 | Sheridon | 359/296 |
| 5,788,814 A | 8/1998 | Sun et al. | 204/297 R |
| 5,793,158 A | 8/1998 | Wedding, Sr. | 313/493 |
| 5,798,604 A | 8/1998 | Duboc, Jr. et al. | 313/495 |
| 5,808,403 A | 9/1998 | Clerc | 313/336 |
| 5,811,833 A | 9/1998 | Thompson | 257/40 |
| 5,815,306 A | 9/1998 | Sheridon et al. | 359/296 |
| 5,825,451 A | 10/1998 | Ma et al. | 349/187 |
| 5,837,221 A | 11/1998 | Bernstein et al. | 424/9.52 |
| 5,844,363 A | 12/1998 | Gu et al. | 313/506 |
| 5,853,446 A | 12/1998 | Carre et al. | 65/17.3 |
| 5,862,054 A | 1/1999 | Li | 364/468.28 |
| 5,865,657 A | 2/1999 | Haven et al. | 445/24 |
| 5,897,414 A | 4/1999 | Bergeron et al. | 445/3 |
| 5,898,266 A | 4/1999 | Spindt et al. | 313/495 |
| 5,913,704 A | 6/1999 | Spindt et al. | 445/24 |
| 5,914,150 A | 6/1999 | Porter et al. | 427/77 |
| 5,917,646 A | 6/1999 | Sheridon | 359/296 |
| 5,920,080 A | 7/1999 | Jones | 257/40 |
| 5,945,174 A | 8/1999 | Shaw et al. | 427/509 |
| 5,949,513 A | 9/1999 | Ma et al. | 349/187 |
| 5,953,587 A | 9/1999 | Forrest et al. | 438/99 |
| 5,964,630 A | 10/1999 | Slusarczuk et al. | 445/25 |
| 5,965,109 A | 10/1999 | Lohrmann | 424/9.52 |
| 5,967,871 A | 10/1999 | Kaake et al. | 445/24 |
| 5,969,472 A | 10/1999 | Kisner | 313/484 |
| 5,975,683 A | 11/1999 | Smith et al. | 347/55 |
| 5,984,747 A | 11/1999 | Bhagavatula et al. | 445/24 |
| 5,985,460 A | 11/1999 | Wang et al. | 428/426 |
| 5,986,409 A | 11/1999 | Farnworth et al. | 315/169.4 |
| 5,990,614 A | 11/1999 | Spindt | 313/495 |
| 5,990,620 A | 11/1999 | Lepselter | 313/585 |
| 6,002,198 A | 12/1999 | Spindt et al. | 313/292 |
| 6,008,582 A * | 12/1999 | Asano et al. | 313/582 |
| 6,013,538 A | 1/2000 | Burrows et al. | 438/22 |
| 6,017,584 A | 1/2000 | Albert et al. | 427/213.3 |
| 6,019,657 A | 2/2000 | Chakvorty et al. | 445/24 |
| 6,022,652 A | 2/2000 | Haven et al. | 430/26 |
| 6,023,259 A | 2/2000 | Howard et al. | 345/76 |
| 6,025,097 A | 2/2000 | Drumm | 430/7 |
| 6,030,269 A | 2/2000 | Drumm | 445/52 |
| 6,030,715 A | 2/2000 | Thompson et al. | 428/690 |
| 6,033,547 A | 3/2000 | Trau et al. | 204/622 |
| 6,037,710 A | 3/2000 | Poole et al. | 313/422 |
| 6,037,918 A | 3/2000 | Hansen et al. | 345/74 |
| 6,038,002 A | 3/2000 | Song | 349/43 |
| 6,039,619 A * | 3/2000 | Kang et al. | 445/24 |
| 6,045,930 A | 4/2000 | Thompson et al. | 428/690 |
| 6,046,543 A | 4/2000 | Bulovic et al. | 313/504 |
| 6,048,469 A | 4/2000 | Xiang et al. | 252/301.6 R |
| 6,048,630 A | 4/2000 | Burrows et al. | 428/690 |
| 6,049,366 A | 4/2000 | Hakemi et al. | 349/86 |
| 6,069,443 A | 5/2000 | Jones et al. | 313/504 |
| 6,072,276 A | 6/2000 | Okajima | 313/581 |
| 6,079,814 A | 6/2000 | Lean et al. | 347/55 |
| 6,080,606 A | 6/2000 | Gleskova et al. | 438/151 |
| 6,087,196 A | 7/2000 | Sturm et al. | 438/29 |
| 6,091,195 A | 7/2000 | Forrest et al. | 313/504 |
| 6,091,380 A | 7/2000 | Hashimoto et al. | 345/60 |
| 6,091,874 A | 7/2000 | Higashi et al. | 384/130 |
| 6,097,147 A | 8/2000 | Baldo et al. | 313/506 |
| 6,120,975 A * | 9/2000 | Tokai et al. | 430/321 |
| 6,130,655 A | 10/2000 | Lammers | 345/72 |
| 6,137,553 A | 10/2000 | Izumi et al. | 349/49 |
| 6,201,518 B1 | 3/2001 | Kane et al. | 345/60 |
| 6,255,777 B1 | 7/2001 | Kim et al. | 313/582 |
| 6,262,706 B1 | 7/2001 | Albert et al. | 345/107 |
| 6,265,826 B1 | 7/2001 | Miyazaki | 313/586 |
| 6,281,863 B1 | 8/2001 | Sasaki et al. | 345/60 |
| 6,285,129 B1 | 9/2001 | Park et al. | 313/586 |
| 6,285,434 B1 | 9/2001 | Ma et al. | 349/189 |
| 6,288,488 B1 | 9/2001 | Amemiya | 313/582 |
| 6,288,693 B1 | 9/2001 | Song et al. | 345/68 |
| 6,291,925 B1 | 9/2001 | Jacobson | 310/319 |
| 6,292,159 B1 | 9/2001 | Someya et al. | 345/60 |
| 6,292,160 B1 | 9/2001 | Mikoshiba et al. | 345/60 |
| 6,295,040 B1 | 9/2001 | Nhan et al. | 345/60 |
| 6,296,539 B1 | 10/2001 | Awaji et al. | 445/24 |
| 6,297,590 B1 | 10/2001 | Nanto et al. | 313/586 |
| 6,300,152 B1 | 10/2001 | Kim | 438/30 |
| 6,300,932 B1 | 10/2001 | Albert | 345/107 |
| 6,304,031 B1 | 10/2001 | Wani et al. | 313/582 |
| 6,304,032 B1 | 10/2001 | Asano | 313/582 |
| 6,304,238 B1 | 10/2001 | Tsuchida | 345/87 |
| 6,307,319 B1 | 10/2001 | Lee | 313/590 |
| 6,312,304 B1 * | 11/2001 | Duthaler et al. | 445/24 |
| 6,312,971 B1 | 11/2001 | Amundson et al. | 438/99 |
| 6,319,325 B1 | 11/2001 | Hiratsuka et al. | 118/718 |
| 6,322,010 B1 | 11/2001 | Sasaki et al. | 239/568 |
| 6,545,422 B1 * | 4/2003 | George et al. | 315/169.3 |
| 6,570,335 B1 * | 5/2003 | George et al. | 315/169.3 |
| 6,577,062 B2 * | 6/2003 | Itokawa et al. | 313/582 |
| 6,612,889 B1 * | 9/2003 | Green et al. | 445/24 |
| 6,620,012 B1 * | 9/2003 | Johnson et al. | 445/3 |
| 6,646,388 B2 * | 11/2003 | George et al. | 315/169.3 |
| 6,762,566 B1 * | 7/2004 | George et al. | 315/169.3 |
| 6,764,367 B2 * | 7/2004 | Green et al. | 445/24 |
| 6,791,264 B2 * | 9/2004 | Green et al. | 313/582 |
| 6,796,867 B2 * | 9/2004 | George et al. | 445/24 |
| 6,801,001 B2 * | 10/2004 | Drobot et al. | 315/169.3 |
| 6,822,626 B2 * | 11/2004 | George et al. | 345/60 |
| 6,902,456 B2 * | 6/2005 | George et al. | 445/24 |
| 6,935,913 B2 * | 8/2005 | Wyeth et al. | 445/3 |
| 6,975,068 B2 * | 12/2005 | Green et al. | 313/582 |
| 7,005,793 B2 * | 2/2006 | George et al. | 313/484 |
| 7,025,648 B2 * | 4/2006 | Green et al. | 445/24 |
| 7,122,961 B1 * | 10/2006 | Wedding | 313/582 |
| 7,125,305 B2 * | 10/2006 | Green et al. | 445/24 |
| 7,137,857 B2 * | 11/2006 | George et al. | 445/24 |
| 7,140,941 B2 * | 11/2006 | Green et al. | 445/24 |
| 7,157,854 B1 * | 1/2007 | Wedding | 313/582 |
| 7,176,628 B1 * | 2/2007 | Wedding | 313/582 |
| 2001/0008825 A1 | 7/2001 | Toyoda et al. | 445/24 |
| 2001/0024084 A1 * | 9/2001 | Kajiwara | 313/486 |
| 2001/0033256 A1 | 10/2001 | Moore | 345/60 |

| | | | | | |
|---|---|---|---|---|---|
| 2001/0053570 A1 | 12/2001 | Kido ............................ 438/149 | 2004/0004445 A1* | 1/2004 | George et al. ............ 315/169.3 |
| 2002/0008470 A1 | 1/2002 | Uegaki et al. ............... 313/567 | 2004/0051450 A1* | 3/2004 | George et al. ............... 313/512 |
| 2002/0009536 A1 | 1/2002 | Iguchi et al. .................. 427/10 | 2004/0063373 A1* | 4/2004 | Johnson et al. ................ 445/24 |
| 2002/0016075 A1 | 2/2002 | Peng et al. ................... 438/700 | 2004/0106349 A1* | 6/2004 | Green et al. .................... 445/24 |
| 2002/0017864 A1 | 2/2002 | Watanabe et al. ............ 313/586 | 2004/0166762 A1* | 8/2004 | Green et al. .................... 445/24 |
| 2002/0022565 A1 | 2/2002 | Sreeram et al. ................. 501/16 | 2004/0175854 A1* | 9/2004 | George et al. ................. 438/30 |
| 2002/0024295 A1 | 2/2002 | Miyashita et al. ........... 313/495 | 2005/0095944 A1* | 5/2005 | George et al. .................. 445/3 |
| 2003/0090213 A1* | 5/2003 | George et al. ............ 315/169.3 | 2005/0206317 A1* | 9/2005 | George et al. ............... 313/582 |
| 2003/0094891 A1* | 5/2003 | Green et al. ................. 313/495 | 2006/0097620 A1* | 5/2006 | George et al. ............... 313/484 |
| 2003/0164684 A1* | 9/2003 | Green et al. ................. 313/582 | 2006/0205311 A1* | 9/2006 | Green et al. .................... 445/24 |
| 2003/0207643 A1* | 11/2003 | Wyeth et al. .................... 445/3 | 2007/0015431 A1* | 1/2007 | Green et al. .................... 445/24 |
| 2003/0207644 A1* | 11/2003 | Green et al. .................... 445/24 | | | |
| 2003/0207645 A1* | 11/2003 | George et al. ................. 445/24 | * cited by examiner | | |
| 2003/0214243 A1* | 11/2003 | Drobot et al. ............ 315/169.3 | | | |

Table showing number of pixels, etc. for various standard display resolutions

| Acronym | Pixels HxV | Aspect | Mpixels |
|---|---|---|---|
| CIF | 352x288 | 4:3 | 0.1 |
| VGA | 640x480 | 4:3 | 0.3 |
| SVGA | 800x600 | 4:3 | 0.5 |
| XGA | 1024x768 | 4:3 | 0.8 |
| HDTV(720p) | 1280x720 | 16:9 | 0.9 |
| SXGA | 1280x1024 | 5:4 | 1.3 |
| SXGA+ | 1400x1050 | 3:4 | 1.5 |
| UXGA | 1600x1200 | 4:3 | 1.9 |
| HDTV(1080p) | 1920x1080 | 16:9 | 2.1 |
| WUXGA | 1920x1200 | 16:10 | 2.3 |
| QXGA | 2048x1536 | 4:3 | 3.1 |
| VXGA | 2048x2048 | 1:1 | 4.2 |
| GXGA/QSXGA | 2560x2048 | 5:4 | 5.2 |
| Photo CD (16Base) | 3072x2048 | 3:2 | 6.3 |
| Photo CD (64Base) | 6144x4096 | 3:2 | 25.0 |

Fig. 8

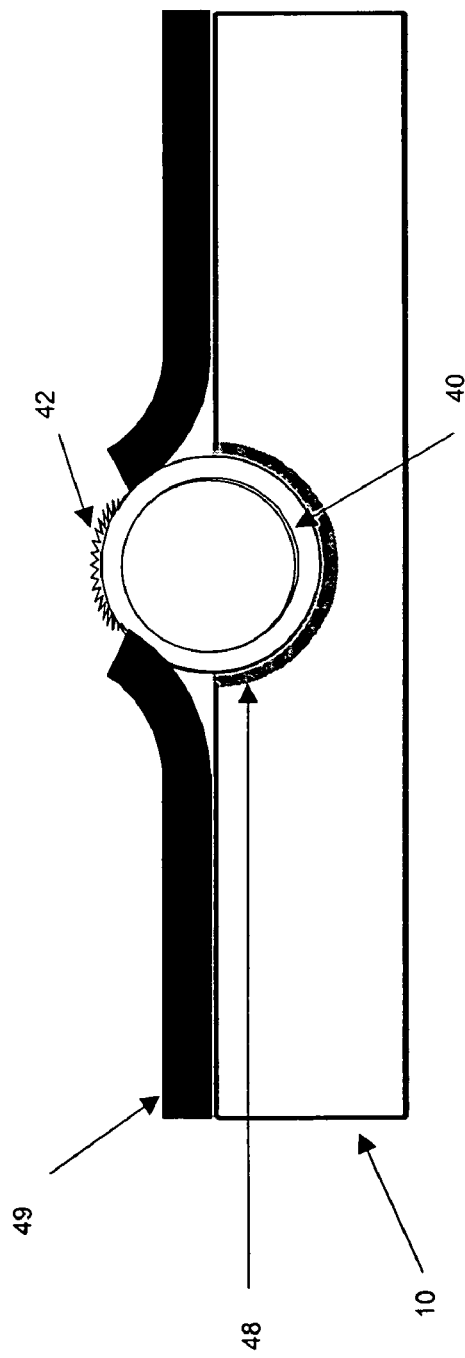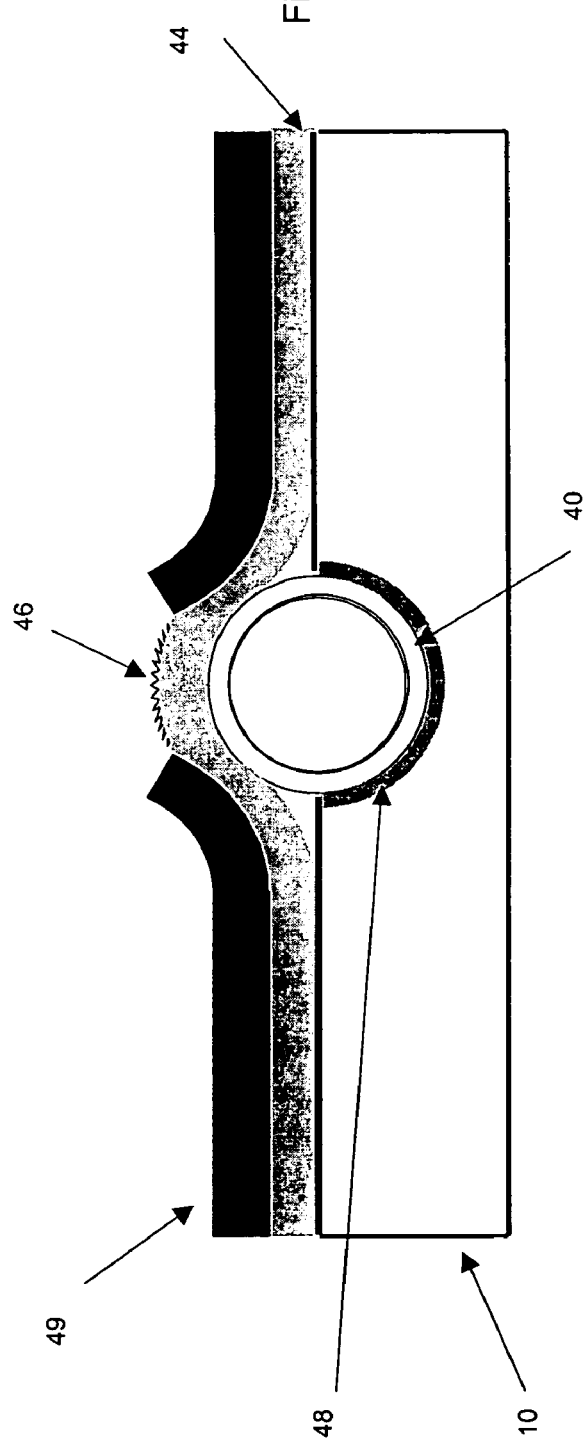

DESIGN, FABRICATION, TESTING, AND CONDITIONING OF MICRO-COMPONENTS FOR USE IN A LIGHT-EMITTING PANEL

CROSS-REFERENCE TO RELATED APPLICATIONS

This is a continuation-in-part of U.S. patent application Ser. No. 10/214,768 filed Aug. 9, 2002, now U.S. Pat. No. 6,822,626, entitled "Design, Fabrication, Testing, and Conditioning of Micro-Components for Use in a Light-Emitting Panel" which is a continuation-in-part of U.S. patent application Ser. No. 09/697,358 entitled "A Micro-Component for Use in a Light-Emitting Panel," filed Oct. 27, 2000, now U.S. Pat. No. 6,762,566, and claims priority to that parent application's filing date. Also referenced hereby are the following applications which are incorporated herein by reference in their entireties, and the filing dates thereof to which priority is also claimed: U.S. patent application Ser. No. 09/697,344 entitled "Method for Making a Light-Emitting Panel," filed Oct. 27, 2000, now U.S. Pat. No. 6,612,889; U.S. patent application Ser. No. 09/697,498 entitled "A Method for Testing a Light-Emitting Panel and the Components Therein," filed Oct. 27, 2000, now U.S. Pat. No. 6,620,012; U.S. patent application Ser. No. 09/697,345 entitled "A Method and System for Energizing a Micro-Component in a Light-Emitting Panel," filed Oct. 27, 2000, now U.S. Pat. No. 6,570,335; U.S. patent application Ser. No. 09/697,346 entitled "A Socket for Use in a Light-Emitting Panel," filed Oct. 27, 2000, now U.S. Pat. No. 6,545,422; U.S. patent application Ser. No. 10/214,769 entitled "Use of Printing and Other Technology for Micro-Component Placement;" U.S. patent application Ser. No. 10/214,740 entitled "Liquid Manufacturing Processes for Panel Layer Fabrication;" U.S. patent application Ser. No. 10/214,716 entitled "Method for On-Line Testing of a Light-Emitting Panel;" and U.S. patent application Ser. No. 10/214,764 entitled "Method and Apparatus for Addressing Micro-Components in a Plasma Display Panel."

BACKGROUND OF THE INVENTION

1. Field of the Invention

The present invention relates to a light-emitting panel and methods of fabricating the same. The present invention further relates to a micro-component for use in a light-emitting panel.

2. Description of Related Art

In a typical plasma display, a gas or mixture of gases is enclosed between orthogonally crossed and spaced conductors. The crossed conductors define a matrix of cross over points, arranged as an array of miniature picture elements (pixels), which provide light. At any given pixel, the orthogonally crossed and spaced conductors function as opposed plates of a capacitor, with the enclosed gas serving as a dielectric. When a sufficiently large voltage is applied, the gas at the pixel breaks down creating free electrons that are drawn to the positive conductor and positively charged gas ions that are drawn to the negatively charged conductor. These free electrons and positively charged gas ions collide with other gas atoms causing an avalanche effect creating still more free electrons and positively charged ions, thereby creating plasma. The voltage level at which this plasma-forming discharge occurs is called the write voltage.

Upon application of a write voltage, the gas at the pixel ionizes and emits light only briefly as free charges formed by the ionization migrate to the insulating dielectric walls of the cell where these charges produce an opposing voltage to the applied voltage and thereby eventually extinguish the discharge. Once a pixel has been written, a continuous sequence of light emissions can be produced by an alternating sustain voltage. The amplitude of the sustain waveform can be less than the amplitude of the write voltage, because the wall charges that remain from the preceding write or sustain operation produce a voltage that adds to the voltage of the succeeding sustain waveform applied in the reverse polarity to produce the ionizing voltage. Mathematically, the idea can be set out as $V_s = V_w - V_{wall}$, where $V_s$ is the sustain voltage, $V_w$ is the write voltage, and $V_{wall}$ is the wall voltage. Accordingly, a previously unwritten (or erased) pixel cannot be ionized by the sustain waveform alone. An erase operation can be thought of as a write operation that proceeds only far enough to allow the previously charged cell walls to discharge; it is similar to the write operation except for timing and amplitude.

Typically, there are two different arrangements of conductors that are used to perform the write, erase, and sustain operations. The one common element throughout the arrangements is that the sustain and the address electrodes are spaced apart with the plasma-forming gas in between. Thus, at least one of the address or sustain electrodes may be located partially within the path the radiation travels, when the plasma-forming gas ionizes, as it exits the plasma display. Consequently, transparent or semi-transparent conductive materials must be used, such as indium tin oxide (ITO), so that the electrodes do not interfere with the displayed image from the plasma display. Using ITO, however, has several disadvantages, for example, ITO is expensive and adds significant cost to the manufacturing process and ultimately the final plasma display.

The first arrangement uses two orthogonally crossed conductors, one addressing conductor and one sustaining conductor. In a gas panel of this type, the sustain waveform is applied across all the addressing conductors and sustain conductors so that the gas panel maintains a previously written pattern of light emitting pixels. For a conventional write operation, a suitable write voltage pulse is added to the sustain voltage waveform so that the combination of the write pulse and the sustain pulse produces ionization. In order to write an individual pixel independently, each of the addressing and sustain conductors has an individual selection circuit. Thus, applying a sustain waveform across all the addressing and sustain conductors, but applying a write pulse a cross only one addressing and one sustain conductor will produce a write operation in only the one pixel at the intersection of the selected addressing and sustain conductors.

The second arrangement uses three conductors. In panels of this type, called coplanar sustaining panels, each pixel is formed at the intersection of three conductors, one addressing conductor and two parallel sustaining conductors. In this arrangement, the addressing conductor orthogonally crosses the two parallel sustaining conductors. With this type of panel, the sustain function is performed between the two parallel sustaining conductors and the addressing is done by the generation of discharges between the addressing conductor and one of the two parallel sustaining conductors.

The sustaining conductors are of two types, addressing-sustaining conductors and solely sustaining conductors. The function of the addressing-sustaining conductors is twofold: to achieve a sustaining discharge in cooperation with the solely sustaining conductors; and to fulfill an addressing role. Consequently, the addressing-sustaining conductors are individually selectable so that an addressing waveform may be applied to any one or more addressing-sustaining conductors. The solely sustaining conductors, on the other hand, are typically connected in such a way that a sustaining waveform can be simultaneously applied to all of the solely sustaining conductors so that they can be carried to the same potential in the same instant.

Numerous types of plasma panel display devices have been constructed with a variety of methods for enclosing a plasma-forming gas between sets of electrodes. In one type of plasma display panel, parallel plates of glass with wire electrodes on the surfaces thereof are spaced uniformly apart and sealed together at the outer edges with the plasma-forming gas filling the cavity formed between the parallel plates. Although widely used, this type of open display structure has various disadvantages. The sealing of the outer edges of the parallel plates, the pumping down to vacuum, the baking out under vacuum, and the introduction of the plasma-forming gas are both expensive and time-consuming processes, resulting in a costly end product. In addition, it is particularly difficult to achieve a good seal at the sites where the electrodes are fed through the ends of the parallel plates. This can result in gas leakage and a shortened product lifecycle. Another disadvantage is that individual pixels are not segregated within the parallel plates. As a result, gas ionization activity in a selected pixel during a write operation may spill over to adjacent pixels, thereby raising the undesirable prospect of possibly igniting adjacent pixels without a write pulse being applied. Even if adjacent pixels are not ignited, the ionization activity can change the turn-on and turn-off characteristics of the nearby pixels.

In another type of known plasma display, individual pixels are mechanically isolated either by forming trenches in one of the parallel plates or by adding a perforated insulating layer sandwiched between the parallel plates. These mechanically isolated pixels, however, are not completely enclosed or isolated from one another because there is a need for the free passage of the plasma-forming gas between the pixels to assure uniform gas pressure throughout the panel. While this type of display structure decreases spill over, spill over is still possible because the pixels are not in total physical isolation from one another. In addition, in this type of display panel it is difficult to properly align the electrodes and the gas chambers, which may cause pixels to misfire. As with the open display structure, it is also difficult to get a good seal at the plate edges. Furthermore, it is expensive and time consuming to pump down to vacuum, bake out under vacuum, introduce the plasma producing gas and seal the outer edges of the parallel plates.

In yet another type of known plasma display, individual pixels are also mechanically isolated between parallel plates. In this type of display, the plasma-forming gas is contained in transparent spheres formed of a closed transparent shell. Various methods have been used to contain the gas filled spheres between the parallel plates. In one method, spheres of varying sizes are tightly bunched and randomly distributed throughout a single layer, and sandwiched between the parallel plates. In a second method, spheres are embedded in a sheet of transparent dielectric material and that material is then sandwiched between the parallel plates. In a third method, a perforated sheet of electrically nonconductive material is sandwiched between the parallel plates with the gas filled spheres distributed in the perforations.

While each of the types of displays discussed above are based on different design concepts, the manufacturing approach used in their fabrication is generally the same. Conventionally, a batch fabrication process is used to manufacture these types of plasma panels. As is well known in the art, in a batch process individual component parts are fabricated separately, often in different facilities and by different manufacturers, and then brought together for final assembly where individual plasma panels are created one at a time. Batch processing has numerous shortcomings, such as, for example, the length of time necessary to produce a finished product. Long cycle times increase product cost and are undesirable for numerous additional reasons known in the art. For example, a sizeable quantity of substandard, defective, or useless fully or partially completed plasma panels may be produced during the period between detection of a defect or failure in one of the components and an effective correction of the defect or failure.

This is especially true of the first two types of displays discussed above; the first having no mechanical isolation of individual pixels, and the second with individual pixels mechanically isolated either by trenches formed in one parallel plate or by a perforated insulating layer sandwiched between two parallel plates. Due to the fact that plasma-forming gas is not isolated at the individual pixel/subpixel level, the fabrication process precludes the majority of individual component parts from being tested until the final display is assembled. Consequently, the display can only be tested after the two parallel plates are sealed together and the plasma-forming gas is filled inside the cavity between the two plates. If post production testing shows that any number of potential problems have occurred, (e.g. poor luminescence or no luminescence at specific pixels/subpixels) the entire display is discarded.

BRIEF SUMMARY OF THE INVENTION

Preferred embodiments of the present invention provide a light-emitting panel that may be used as a large-area radiation source, for energy modulation, for particle detection and as a flat-panel display. Gas-plasma panels are preferred for these applications due to their unique characteristics.

In one basic form, the light-emitting panel may be used as a large area radiation source. By configuring the light-emitting panel to emit ultraviolet (UV) light, the panel has application for curing paint or other coatings, and for sterilization. With the addition of one or more phosphor coatings to convert the UV light to visible white light, the panel also has application as an illumination source.

In addition, the light-emitting panel may be used as a plasma-switched phase array by configuring the panel in at least one embodiment in a microwave transmission mode. The panel is configured in such a way that during ionization the plasma-forming gas creates a localized index of refraction change for the microwaves (although other electromagnetic wavelengths would work). The microwave beam from the panel can then be steered or directed in any desirable pattern by introducing at a localized area a phase shift and/or directing the microwaves out of a specific aperture in the panel Additionally, the light-emitting panel may be used for particle/photon detection. In this embodiment, the light-emitting panel is subjected to a potential that is just slightly below the write voltage required for ionization. When the device is subjected to outside energy at a specific position or location in the panel, that additional energy causes the plasma-forming gas in the specific area to ionize, thereby providing a means of detecting outside energy.

Further, the light-emitting panel may be used in flat-panel displays. These displays can be manufactured very thin and lightweight, when compared to similar sized cathode ray tube (CRTs), making them ideally suited for home, office, theaters and billboards. In addition, these displays can be manufactured in large sizes and with sufficient resolution to accommodate high-definition television (HDTV). Gas-plasma panels do not suffer from electromagnetic distortions and are, therefore, suitable for applications strongly affected by magnetic fields, such as military applications, radar systems, railway stations and other underground systems.

According to a general embodiment of the present invention, a light-emitting panel is made from two substrates, wherein one of the substrates includes a plurality of sockets and wherein at least two electrodes are disposed. At least partially disposed in each socket is a micro-component, although more than one micro-component may be disposed therein. Each micro-component includes a shell at least partially filled with a gas or gas mixture capable of ionization. When a large enough voltage is applied a cross the micro-component the gas or gas mixture ionizes forming plasma and emitting radiation.

In one embodiment of the present invention, the micro-component is configured to emit ultra-violet (UV) light, which may be converted to visible light by at least partially coating each micro-component with phosphor. To obtain an improvement in the discharge characteristics, each micro-component may be at least partially coated with a secondary emission enhancement material.

In another embodiment, each micro-component is at least partially coated with a reflective material. An index matching material is disposed so as to be in contact with at least a portion of the reflective material. The combination of the index matching material and the reflective material permits a predetermined wavelength of light to be emitted from each micro-component at the point of contact between the index matching material and the reflective material.

Another object of the present invention is to provide a micro-component for use in a light-emitting panel. A shell at least partially filled with at least one plasma-forming gas provides the basic micro-component structure. The shell may be doped or ion implanted with a conductive material, a material that provides secondary emission enhancement, and/or a material that converts UV light to visible light. The micro-components will be made as a sphere, cylinder or any other shape. The size and shape will be determined in accordance with the desired resolution for the display panel to be assembled. Typical sizes are about hundreds of microns independent of shape.

Another preferred embodiment of the present invention is to provide a method of making a micro-component. In one embodiment, the method is part of a continuous process, where a shell is at least partially formed in the presence of at least one plasma-forming gas, such that when formed, the shell is filled with the plasma-forming gas or gas mixture.

In another embodiment, the micro-component is made by affixing a first substrate to a second substrate in the presence of at least one plasma-forming gas. In this method, either the first and/or the second substrate contains a plurality of cavities so that when the first substrate is affixed to the second substrate the plurality of cavities are filled with the plasma-forming gas or gas mixture. In a preferred embodiment, a first substrate is advanced through a first roller assembly, which includes a roller with a plurality of nodules and a roller with a plurality of depressions. Both the plurality of nodules and the plurality of depressions are in registration with each other so that when the first substrate passes through the first roller assembly, the first substrate has a plurality of cavities formed therein. A second substrate is advanced through a second roller assembly and then affixed to the first substrate in the presence of at least one gas so that when the two substrates are affixed the cavities are filled with the gas or gas mixture. In an alternate preferred embodiment, the second roller assembly includes a roller with a plurality of nodules and a roller with a plurality of depressions so that when the second substrate passes through the second roller assembly, the second substrate also has a plurality of cavities formed therein. In either of these embodiments, at least one electrode may be sandwiched between the first and second substrates prior to the substrates being affixed.

In another embodiment, at least one substrate is thermally treated in the presence of a least one plasma-forming gas so as to form shells filled with the plasma-forming gas or gas-mixture.

In a specific aspect, the micro-components, whether sphere, capillary or other shape are coated with a frequency converting coating. Phosphor is an example of such a coating. More specifically, the coating converts electromagnetic radiation generated in the plasma in the ultraviolet region of the spectrum, and converts it to the visible red, blue or green region of the spectrum.

Alternatives include putting a drop of the frequency converting material in a socket into which the micro-component is placed, or the micro-component itself can be doped with a material such as a rare earth that is a frequency converter. Examples of materials include barium fluoride or the like, yttrium aluminum garnet, or gadolinium gallium garnet. The plasma gases in the micro-component can include xenon chloride, argon chloride, etc., namely the rare gas halides.

In another aspect, the micro-components are tested as they are manufactured. The micro-components are optionally scanned for certain physical characteristics or defects, for example, in an optical field detecting shape such as sphericity and size as they drop through a tower. A micro-component displacement device can be used to remove those that are bad. At a subsequent layer, as they drop the micro-components are subjected to electron beam excitation, microwave or RF field, for example, to excite the gas. Another physical characteristic or defect is tested, such as if a certain luminous output is achieved, and if achieved, it is preliminarily accepted. Those for which a desired luminous output is not achieved are discarded, for example, through the use of a second micro-component displacement device.

In yet still another aspect, the micro-components are preconditioned by being excited for a predetermined period of time. Examples include taking the micro-components that passed the initial test, placing them in a container and exciting them, for example, for 5 to 10 hours. Alternatively, they can be placed between large parallel electrodes. After the batch run, they are dropped through a tower as they are excited, output detected and the ones that do not excite are knocked out of the stream.

In a further aspect of the invention, the micro-components are texturized using a technique such as sandblasting, etching, lithography or the like. The texturized portion allows light generated within the micro-component to exit the micro-component. Alternatively, the micro-components are optically contacted to one surface of an overlay layer, wherein the overlay has been texturized on the opposite surface at least those areas near wherein the other surface of the overlay optically contacts the micro-components.

Other features, advantages, and embodiments of the invention are set forth in part in the description that follows, and in part, will be obvious from this description, or may be learned from the practice of the invention.

BRIEF DESCRIPTION OF THE DRAWINGS

The foregoing and other features and advantages of this invention will become more apparent by reference to the following detailed description of the invention taken in conjunction with the accompanying drawings.

FIG. 8 is a table showing numbers of pixels for various standard display resolutions.

FIGS. 14a and 14b each depict a portion of a light-emitting panel showing a micro-component disposed in socket, further having a texturized portion and a black mask according to embodiments of the present invention.

DETAILED DESCRIPTION OF THE PREFERRED EMBODIMENTS OF THE INVENTION

As embodied and broadly described herein, the preferred embodiments of the present invention are directed to a novel light-emitting panel. In particular, the preferred embodiments are directed to a micro-component capable of being used in the light-emitting panel and at least partially disposed in at least one socket.

Figure 1:
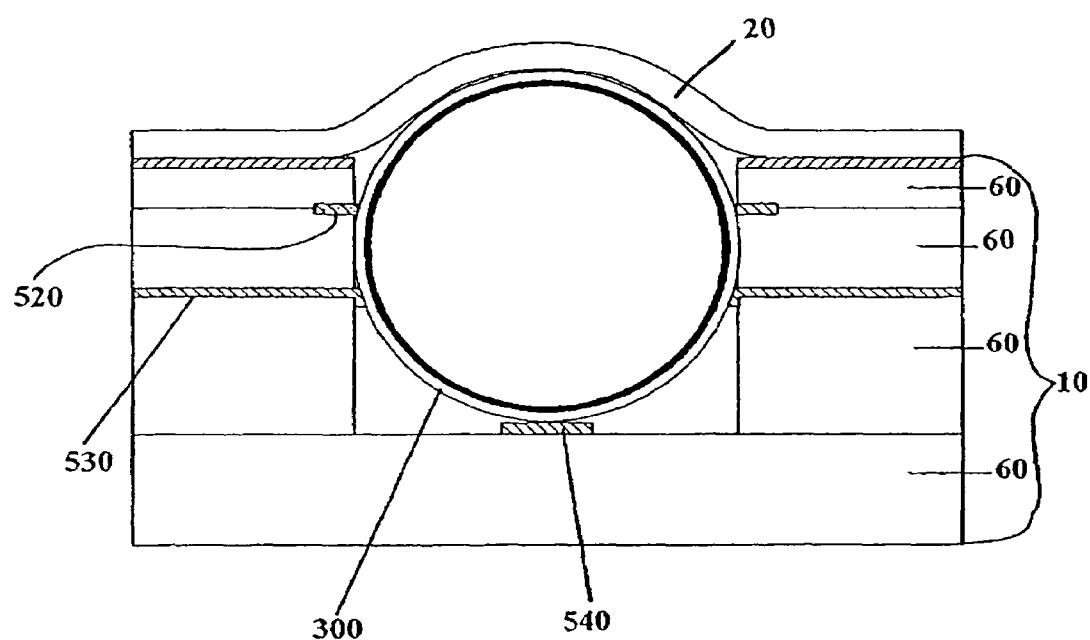
FIG. 1 shows a socket with a micro-component disposed therein.
Figure 2:
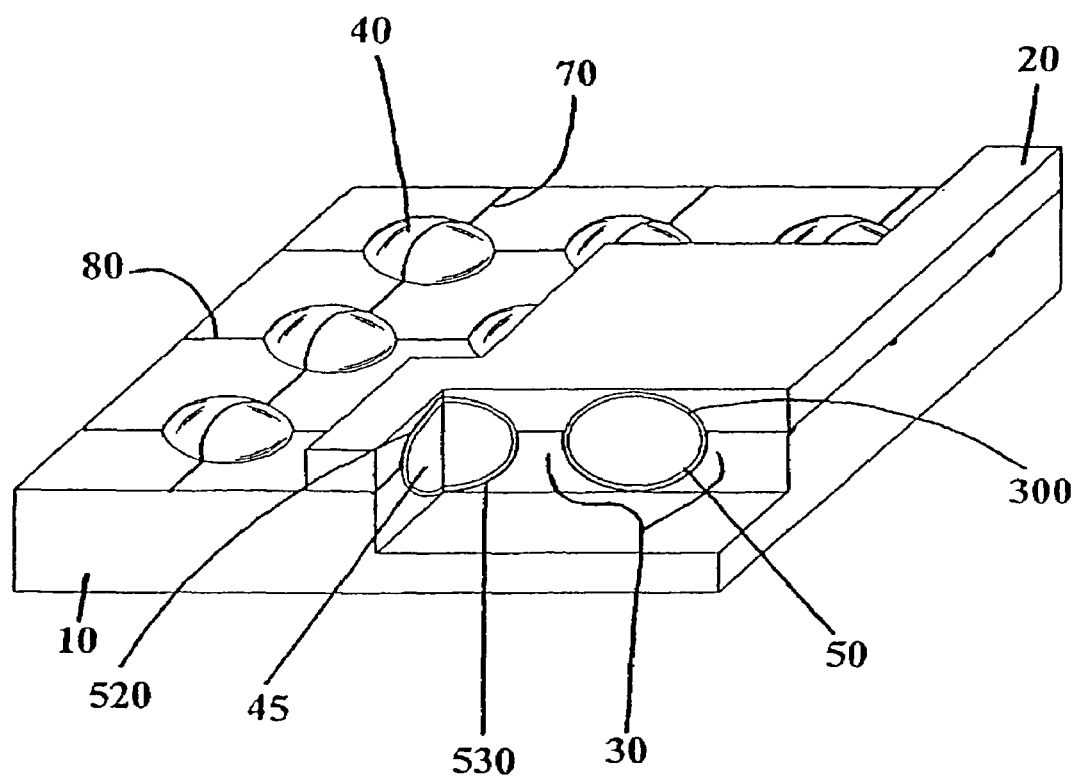
FIG. 2 depicts a portion of a light-emitting panel showing a plurality of micro-components disposed in sockets.
Figure 3A:
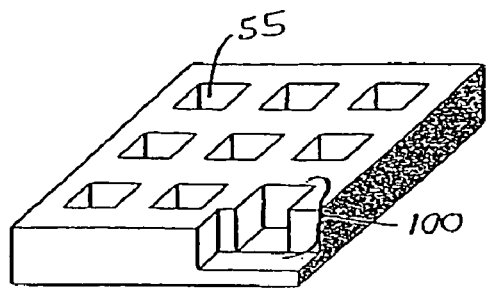
FIG. 3A shows an example of a cavity that has a cube shape.
Figure 3B:
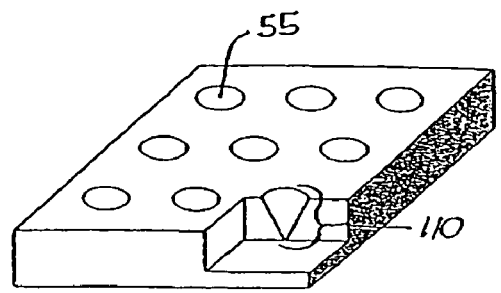
FIG. 3B shows an example of a cavity that has a cone shape.
Figure 3C:
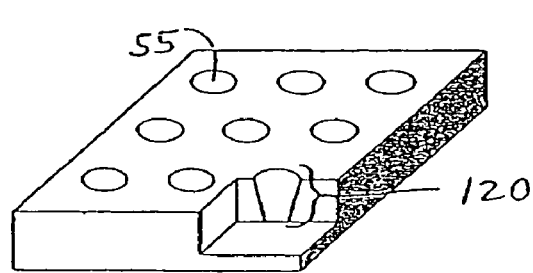
FIG. 3C shows an example of a cavity that has a conical frustum shape.
Figure 3D:
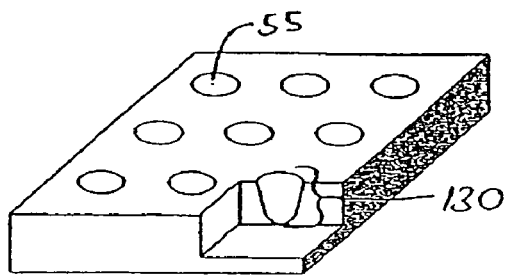
FIG. 3D shows an example of a cavity that has a paraboloid shape.
Figure 3E:
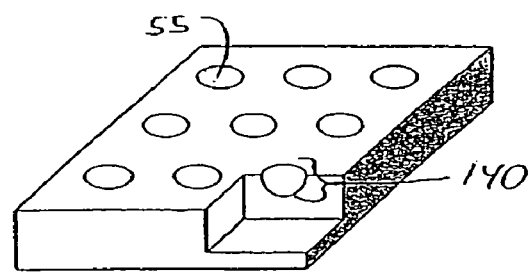
FIG. 3E shows an example of a cavity that has a spherical shape.
Figure 3F:
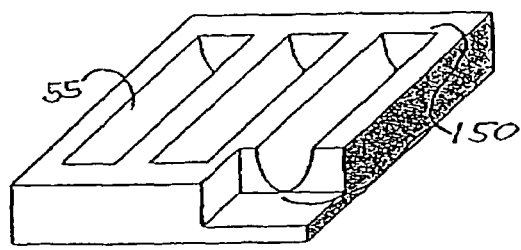
FIG. 3F shows an example of a cavity that has a hemicylindrical shape.
Figure 3G:
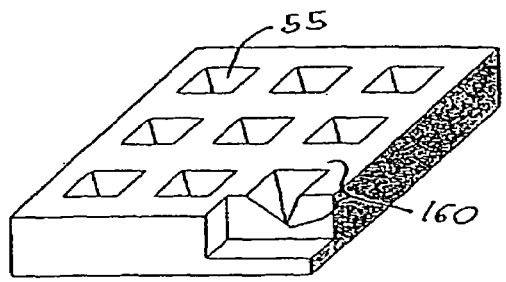
FIG. 3G shows an example of a cavity that has a pyramid shape.
Figure 3H:
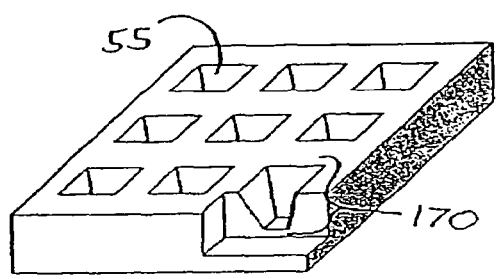
FIG. 3H shows an example of a cavity that has a pyramidal frustum shape.
Figure 3I:
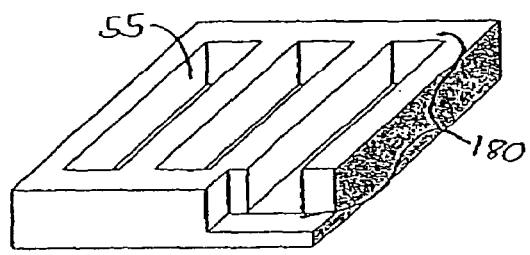
FIG. 3I shows an example of a cavity that has a parallelepiped shape.
Figure 3J:
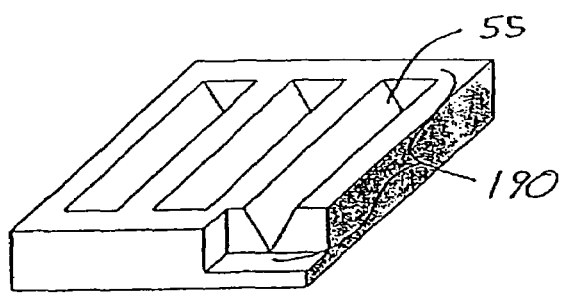
FIG. 3J shows an example of a cavity that has a prism shape.

FIGS. 1 and 2 show two embodiments of the present invention wherein a light-emitting panel includes a first substrate 10 and a second substrate 20. The first substrate 10 may be made from silicates, polypropylene, quartz, glass, any polymeric-based material or any material or combination of materials known to one skilled in the art. Similarly, second substrate 20 may be made from silicates, polypropylene, quartz, glass, any polymeric-based material or any material or combination of materials known to one skilled in the art. First substrate 10 and second substrate 20 may both be made from the same material or each of a different material. Additionally, the first and second substrate may be made of a material that dissipates heat from the light-emitting panel. In a preferred embodiment, each substrate is made from a material that is mechanically flexible.

The first substrate 10 includes a plurality of sockets 30. A cavity 55 formed within and/or on the first substrate 10 provides the basic socket 30 structure. The cavity 55 may be any shape and size. As depicted in FIGS. 3A–3J, the shape of the cavity 55 may include, but is not limited to, a cube 100, a cone 110, a conical frustum 120, a paraboloid 130, spherical 140, cylindrical 150, a pyramid 160, a pyramidal frustum 170, a parallelepiped 180, or a prism 190. The size and shape of the socket 30 influence the performance and characteristics of the light-emitting panel and are selected to optimize the panel's efficiency of operation. In addition, socket geometry may be selected based on the shape and size of the micro-component to optimize the surface contact between the micro-component and the socket and/or to ensure connectivity of the micro-component and any electrodes disposed within the socket. Further, the size and shape of the sockets 30 may be chosen to optimize photon generation and provide increased luminosity and radiation transport efficiency.

At least partially disposed in each socket 30 is at least one micro-component 40. Multiple micro-components may be disposed in a socket to provide increased luminosity and enhanced radiation transport efficiency. In a color light-emitting panel according to one embodiment of the present invention, a single socket supports three micro-components configured to emit red, green, and blue light, respectively. The micro-components 40 may be of any shape, including, but not limited to, spherical, cylindrical, and aspherical. In addition, it is contemplated that a micro-component 40 includes a micro-component placed or formed inside another structure, such as placing a spherical micro-component inside a cylindrical-shaped structure. In a color light-emitting panel according to an embodiment of the present invention, each cylindrical-shaped structure holds micro-components configured to emit a single color of visible light or multiple colors arranged red, green, blue, or in some other suitable color arrangement.

In another embodiment of the present invention, an adhesive or bonding agent is applied to each micro-component to assist in placing/holding a micro-component 40 or plurality of micro-components in a socket 30. In an alternative embodiment, an electrostatic charge is placed on each micro-component and an electrostatic field is applied to each micro-component to assist in the placement of a micro-component 40 or plurality of micro-components in a socket 30. Applying an electrostatic charge to the micro-components also helps avoid agglomeration among the plurality of micro-components. In one embodiment of the present invention, an electron gun is used to place an electrostatic charge on each micro-component and one electrode disposed proximate to each socket 30 is energized to provide the needed electrostatic field required to attract the electrostatically charged micro-component.

In its most basic form, each micro-component 40 includes a shell 50 filled with a plasma-forming gas or gas mixture 45. Any suitable gas or gas mixture 45 capable of ionization may be used as the plasma-forming gas, including, but not limited to, krypton, xenon, argon, neon, oxygen, helium, mercury, and mixtures thereof. In fact, any noble gas could be used as the plasma-forming gas, including, but not limited to, noble gases mixed with cesium or mercury. Further, rare gas halide mixtures such as xenon chloride, xenon fluoride and the like are also suitable plasma-forming gases. Rare gas halides are efficient radiators having radiating wavelengths of approximately 300 to 350 nm, which is longer than that of pure xenon (147 to 170 nm). This results in an overall quantum efficiency gain, i.e., a factor of two or more, given by the mixture ratio. Still further, in another embodiment of the present invention, rare gas halide mixtures are also combined with other plasma-forming gases as listed above. This description is not intended to be limiting. One skilled in the art would recognize other gasses or gas mixtures that could also be used. In a color display, according to another embodiment, the plasma-forming gas or gas mixture 45 is chosen so that during ionization the gas will irradiate a specific wavelength of light corresponding to a desired color. For example, neon-argon emits red light, xenon-oxygen emits green light, and krypton-neon emits blue light. While a plasma-forming gas or gas mixture 45 is used in a preferred embodiment, any other material capable of providing luminescence is also contemplated, such as an electro-luminescent material, organic light-emitting diodes (OLEDs), or an electro-phoretic material.

The shell 50 may be made from a wide assortment of materials, including, but not limited to, barium fluoride or similar materials such as yttrium aluminum garnet, gadolinium gallium garnet, silicates, borates, silicate/borate mixtures, phosphates, these and other compounds in a glassy state, alumino-silica glasses, alkali silicate glasses, any polymeric-based material, magnesium oxide, and quartz and may be of any suitable size. The shell 50 may have a diameter ranging from micrometers to centimeters as measured across its minor axis, with virtually no limitation as to its size as measured across its major axis. For example, a cylindrical-shaped micro-component may be only 100 microns in diameter across its minor axis, but may be hundreds of meters long a cross its major axis. In a preferred embodiment, the outside diameter of the shell, as measured across its minor axis, is from 100 microns to 300 microns. In addition, the shell thickness may range from micrometers to millimeters, with a preferred thickness from 1 micron to 10 microns.

When a sufficiently large voltage is applied across the micro-component the gas or gas mixture ionizes forming plasma and emitting radiation. In FIG. 2, a two electrode configuration is shown including a first sustain electrode 520 and an address electrode 530. In FIG. 1, a three electrode configuration is shown, wherein a first sustain electrode 520, an address electrode 530 and a second sustain electrode 540 are disposed within a plurality of material layers 60 that form the first substrate 10. The potential required to initially ionize the gas or gas mixture inside the shell 50 is governed by Paschen's Law and is closely related to the pressure of the gas inside the shell. In the present invention, the gas pressure inside the shell 50 ranges from tens of torrs to several atmospheres. In a preferred embodiment, the gas pressure ranges from 100 torr to 700 torr or higher pressure as appropriate. The size and shape of a micro-component 40 and the type and pressure of the plasma-forming gas contained therein, influence the performance and characteristics of the light-emitting panel and are selected to optimize the panel's efficiency of operation.

There are a variety of coatings 300 and dopants that may be added to a micro-component 40 that also influence the performance and characteristics of the light-emitting panel. The coatings 300 may be applied to the outside or inside of the shell 50, and may either partially or fully coat the shell 50. Types of outside coatings include, but are not limited to, coatings used to convert UV light to visible light (e.g. phosphor), coatings used as reflecting filters, and coatings used as bandpass filters. Types of inside coatings include, but are not limited to, coatings used to convert UV light to visible light (e.g. phosphor), coatings used to enhance secondary emissions and coatings used to prevent erosion. One skilled in the art will recognize that other coatings may also be used. The coatings 300 may be applied to the shell 50 by differential stripping, lithographic process, sputtering, laser deposition, chemical deposition, vapor deposition, or deposition using ink jet technology. One skilled in the art will realize that other methods of coating the inside and/or outside of the shell 50 may also work. Types of dopants include, but are not limited to, dopants used to convert UV light to visible light (e.g. phosphor), dopants used to enhance secondary emissions and dopants used to provide a conductive path through the shell 50. The dopants are added to the shell 50 by any suitable technique known to one skilled in the art, including ion implantation. It is contemplated that any combination of coatings and dopants may be added to a micro-component 40.

In an embodiment of the present invention, when a micro-component is configured to emit UV light, the UV light is converted to visible light by at least partially coating the inside of the shell 50 with phosphor, at least partially coating the outside of the shell 50 with phosphor, doping the shell 50 with phosphor and/or coating the inside of a socket 30 with phosphor. In a color panel, according to an embodiment of the present invention, colored phosphor is chosen so the visible light emitted from alternating micro-components is colored red, green and blue, respectively. By combining these primary colors at varying intensities, all colors can be formed. It is contemplated that other color combinations and arrangements may be used.

To obtain an improvement in discharge characteristics, in an embodiment of the present invention, the shell 50 of each micro-component 40 is at least partially coated on the inside surface with a secondary emission enhancement material. Any low affinity material may be used including, but not limited to, magnesium oxide and thulium oxide. One skilled in the art would recognize that other materials will also provide secondary emission enhancement. In another embodiment of the present invention, the shell 50 is doped with a secondary emission enhancement material. It is contemplated that the doping of shell 50 with a secondary emission enhancement material may be in addition to coating the shell 50 with a secondary emission enhancement material. In this case, the secondary emission enhancement material used to coat the shell 50 and dope the shell 50 may be different.

Alternatively to the previously discussed phosphor which can be used to coat the micro-component, or alternatively, placed into a socket in a display panel in which the micro-components are placed, the micro-component material can be doped with a rare earth that is a frequency converter. The micro-component material to host such dopants can include barium fluoride or similar materials such as yttrium aluminum garnet, or gadolinium gallium garnet. These types of frequency converting doped materials serve to convert plasma light at the UV wavelength to visible light of red, blue or green color. The gasses in the micro-component in such cases will include rare gas halide mixtures such as xenon chloride, xenon fluoride and the like. Rare gas halides are efficient radiators having radiating wavelengths of approximately 300 to 350 nm, which is longer than that of pure xenon (147 to 170 nm). This results in an overall quantum efficiency gain, i.e., a factor of two or more, given by the mixture ratio. Still further, in another embodiment of the present invention, rare gas halide mixtures are also combined with other plasma-forming gases as listed previously. This description is not intended to be limiting. In the case when such frequency converting materials are used, instead of using a phosphor coating, they can be integrated as a dopant in the shell of the micro-component. For example, yttrium aluminum garnet doped with cerium can serve to convert UV wavelengths from rare gas halides into green light.

Further to the embodiments described above, wherein the shell of the micro-component, made of a material such as barium fluoride or similar materials such as yttrium aluminum garnet, gadolinium gallium garnet, silicates, borates, silicate/borate mixtures, phosphates, these and other compounds in a glassy state, alumino-silica glasses, alkali silicate glasses, is doped with a rare earth, frequency converting species such as europium 2+ for blue, europium 3+ for red, cerium 3+ for violet (deep blue), or cerium 3+ plus terbium 3+ for green, an additional embodiment of the invention includes texturizing the surface of the shell in order to allow trapped, emitted light out of the shell. In certain embodiments of the present invention, the smooth, doped shell acts as a waveguide, wherein the visible photons emitted from the dopant ions in the micro-component become trapped in the shell of the micro-component, which is on the order of 2–4 microns in thickness, by internal reflection. In order to exit the shell, the trapped photons must achieve an appropriate exit angle with the surface. In this additional embodiment of the present invention, the photons are able to achieve the appropriate exit angle when the exiting surface of the shell is texturized. Referring to FIG. 14*a*, substrate 10 encompasses micro-component 40 which includes texturized area 42 on the exit surface. Alternatively, the exit surface itself is not actually texturized, but is optically contacted to an overlay layer 44 shown in FIG. 14*b* that has a texturized surface area 46 nearby as described further below. An additional embodiment of the invention has a reflective element 48 under each micro-component to redirect those emitted photons that do escape from the micro-component shell layer back toward the front of the panel.

In a first particular embodiment, a portion of the surface of the shell of each micro-component is texturized through a texturizing process such as etching, lithography, sandblasting or the like. The texturing process may take place at various stages in the continuous process for forming micro-components. For example, referring to the process described below with regarding to FIG. 4 of the present application, the texturizing process could take place while the micro-component is in the refining region 660. Further the micro-component may be texturized either before or after the doping process. Alternatively, referring to FIGS. 5–6 and 9, the texturizing step could take place with respect to first substrate 200 in FIG. 5 and/or second substrate 210 in FIGS. 6 and 9, prior to formation of the micro-components 250 and 270, respectively or alternatively still, after formation of the micro-components 250 and 270. Further, the micro-components may also be texturized after placement within the light emitting panels, i.e., after placement within their respect sockets. For example, referring to the processing steps described with regard to FIG. 12 of U.S. Pat. No. 6,612,889, which is incorporated herein by reference, the micro-components could be texturized after the "Micro-Component Placement Process" 850 and "Micro-Components in Sockets on Substrate with Electrodes" 440, but before the "Substrate Application & Alignment Process" 870. Also, referring to FIG. 10 of U.S. patent application Ser. No. 10/214,740, which is incorporated herein by reference, the micro-components could be texturized after step 210, "Micro-component placement."

In this further embodiment, the surface of the doped micro-component is texturized using at least one process including etching, lithography, sandblasting or the like. The exact size of the texturized area varies with the size and spacing of the micro-components. For example, in a light-emitting panel wherein the micro-components are separated by hundreds of microns, e.g., 100 to 1000 microns, the diameter of the texturized portion of the micro-component is on the order of tens of microns in diameter, e.g., 20 to 300 microns. When the dopant ions in the micro-component material are stimulated by UV radiation from the plasma discharge within the micro-component, they emit visible radiation, some of which internally strikes the micro-component wall at an angle of incidence greater than the critical angle and therefore is totally reflected and initially trapped within the micro-component wall. Most of this trapped radiation is then emitted through the texturized portion of the micro-component and thus is concentrated. This concentrated luminosity contributes greatly to increased contrast ratio when viewing the light-emitting panel. In addition, contrast ratio is further increased with the use of a black mask 49 covering all but the texturized areas of the micro-components or texturized overlay as shown in FIGS. 14*a* and *b* and described further below. The use of enhancement materials, such as the black mask, are described in the patents and patent applications incorporated by reference above.

In still a further embodiment of the present invention, the texturized area is included on an overlay, as opposed to physically altering the texture of the micro-components. Referring, for example, to the processing steps described with regard to FIG. 12 of U.S. Pat. No. 6,612,889, which is incorporated herein by reference, the texturized overlay could be part of the second substrate, wherein the second substrate is texturized at step 820 along with the "Circuit & Electrode Printing Process" in the continuous process for forming a light emitting panel. Alternatively, the texturizing step could be performed before or after step 820. In addition to having a texturized area for trapped light release, the overlay is indexed matched to the micro-component material at the point of optical contact, so as to maximize the amount of trapped radiation transferred from the micro-component to the overlay. Similarly, referring to FIG. 10 of U.S. patent application Ser. No. 10/214,740, which is incorporated herein by reference, the formation of the texturized areas may be included after curing of the protective layer 224, i.e., through the techniques described above such as etching, lithography, sandblasting or the like.

In addition to, or in place of, doping the shell 50 with a secondary emission enhancement material, according to an embodiment of the present invention, the shell 50 is doped with a conductive material. Possible conductive materials include, but are not limited to silver, gold, platinum, and aluminum. Doping the shell 50 with a conductive material, either in two or more localized areas to provide separate electrode-like paths or in a way to produce anisotropic conductivity in the shell (high perpendicular conductivity, low in-plane conductivity), provides a direct conductive path to the gas or gas mixture contained in the shell and provides one possible means of achieving a DC light-emitting panel. In this manner, shorting is avoided and two or more separate electrode paths are maintained to allow exciting of the gas.

In another embodiment of the present invention, the shell 50 of the micro-component 40 is coated with a reflective material. An index matching material that matches the index of refraction of the reflective material is disposed so as to be in contact with at least a portion of the reflective material. The reflective coating and index matching material may be separate from, or in conjunction with, the phosphor coating and secondary emission enhancement coating of previous embodiments. The reflective coating is applied to the shell 50 in order to enhance radiation transport. By also disposing an index-matching material so as to be in contact with at least a portion of the reflective coating, a predetermined wavelength range of radiation is allowed to escape through the reflective coating at the interface between the reflective coating and the index-matching material. By forcing the radiation out of a micro-component through the interface area between the reflective coating and the index-matching material greater micro-component efficiency is achieved with an increase in luminosity. In an embodiment, the index matching material is coated directly over at least a portion of the reflective coating. In another embodiment, the index matching material is disposed on a material layer, or the like, that is brought in contact with the micro-component such that the index matching material is in contact with at least a portion of the reflective coating. In another embodiment, the size of the interface is selected to achieve a specific field of view for the light-emitting panel.

Several methods are proposed, in various embodiments, for making a micro-component for use in a light-emitting panel. It has been contemplated that each of the coatings and dopants that may be added to a micro-component 40, as disclosed herein, may also be included in steps in forming a micro-component, as discussed herein.

In one embodiment of the present invention, a continuous inline process for making a micro-component is described, where a shell is at least partially formed in the presence of at least one plasma-forming gas, such that when formed, the shell is filled with the gas or gas mixture. In a preferred embodiment, the process takes place in a drop tower. According to FIG. 4, and as an example of one of many possible ways to make a micro-component as part of a continuous inline process, a droplet generator 600 including a pressure transducer port 605, a liquid inlet port 610, a piezoelectric transducer 615, a transducer drive signal electrode 620, and an orifice plate 625, produces uniform water droplets of a predetermined size. The droplets pass through an encapsulation region 630 where each water droplet is encased in a gel outer membrane formed of an aqueous solution of glass forming oxides (or any other suitable material that may be used for a micro-component shell), which is then passed through a dehydration region 640 leaving a hollow dry gel shell. This dry gel shell then travels through a transition region 650 where it is heated into a glass shell (or other type of shell depending on what aqueous solution was chosen) and then finally through a refining region 660. While it is possible to introduce a plasma-forming gas or gas mixture into the process during any one of the steps, it is preferred in an embodiment of the present invention to perform the whole process in the presence of the plasma-forming gas or gas mixture. Thus, when the shell leaves the refining region 660, the plasma-forming gas or gas mixture is sealed inside the shell thereby forming a micro-component.

In an embodiment of the present invention, the above process is modified so that the shell can be doped with either a secondary emission enhancement material and/or a conductive material, although other dopants may also be used. While it is contemplated that the dopants may be added to the shell by ion implantation at later stages in the process, in a preferred embodiment, the dopant is added directly in the aqueous solution so that the shell is initial formed with the dopant already present in the shell.

The above process steps may be modified or additional process steps may be added to the above process for forming a micro-component to provide a means for adding at least one coating to the micro-component. For coatings that may be disposed on the inside of the shell including, but not limited to a secondary emission enhancement material and a conductive material, it is contemplated in an embodiment of the present invention that those coating materials are added to the initial droplet solution so that when the outer membrane is formed around the initial droplet and then passed through the dehydration region 640 the coating material is left on the inside of the hollow dry gel shell. For coatings that may be disposed on the outside of the shell including, but not limited to, coatings used to convert UV light to visible light, coatings used as reflective filters and coatings used as band-gap filters, it is contemplated that after the micro-component leaves the refining region 660, the micro-component will travel through at least one coating region. The coatings may be applied by any number of processes known to those skilled in the art as a means of applying a coating to a surface.

Figure 4:
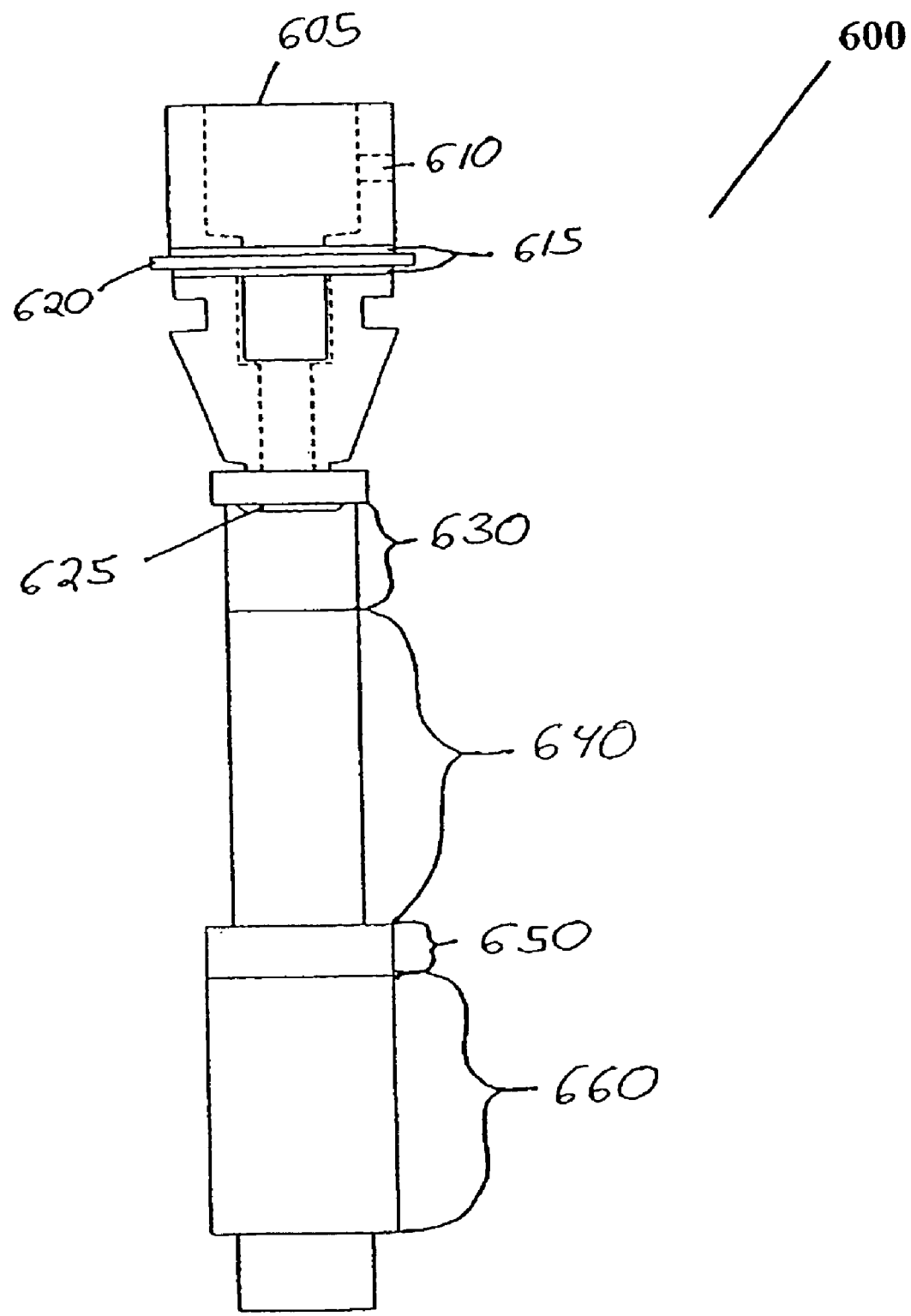
FIG. 4 shows an apparatus used in an embodiment of the present invention as part of a continuous process for forming micro-components.
Figure 11:
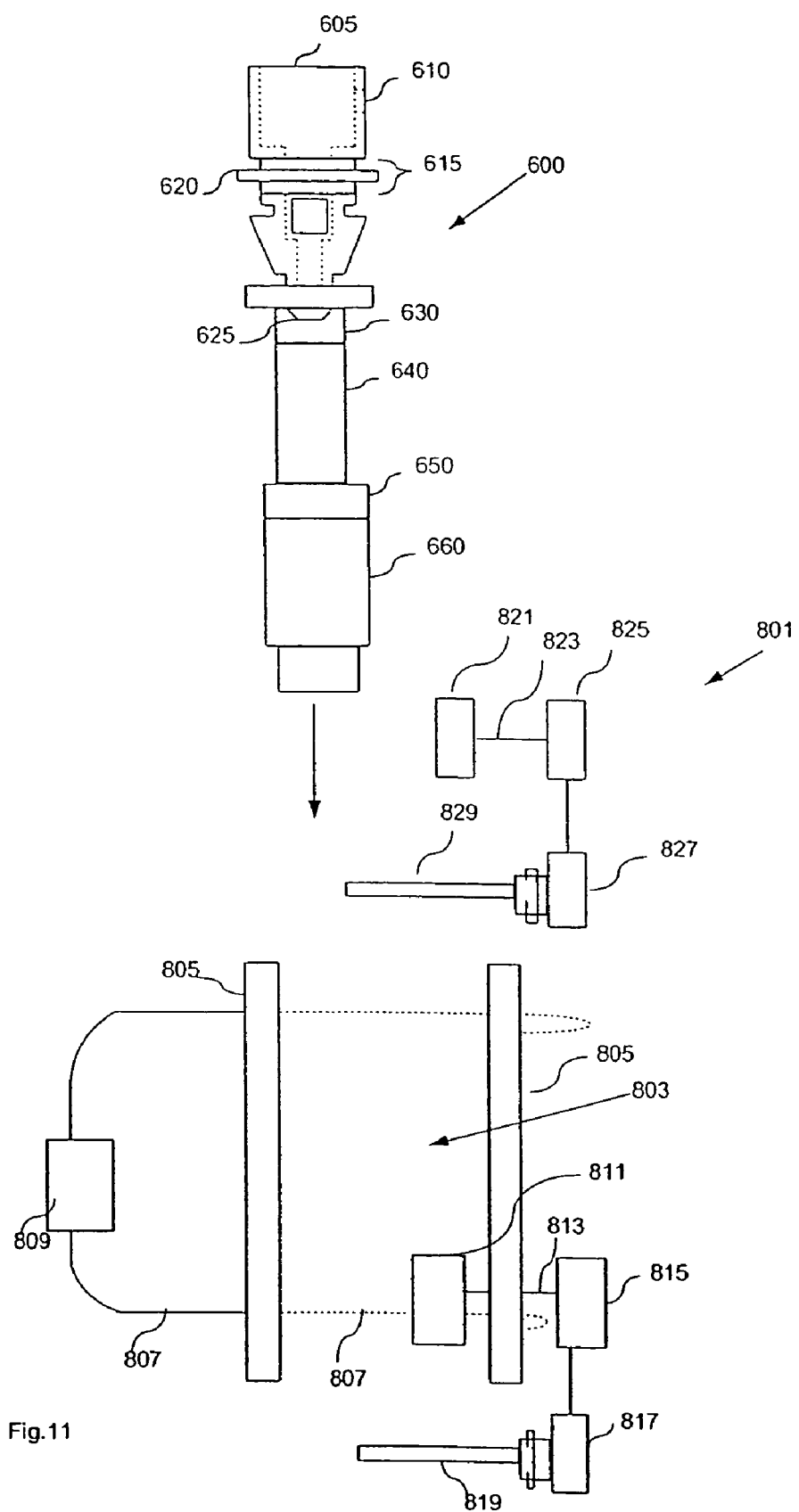
FIG. 11 shows an apparatus used in an embodiment of the present invention as part of a continuous process for forming micro-components similar to that of FIG. 4, and including a mechanism for pretesting or pre-screening of micro-components prior to assembly in a panel.

A further modification of the drop tower of FIG. 4 is illustrated in FIG. 11 with a continuous testing region 801. The continuous testing region 801 includes a first optical detector 821 which detects individual micro-components as they are formed. This optical detector can detect such things as sphericity and size in a continuous process, typically operating at about 10 kilohertz sampling rate. Signals representing the micro-component detected are passed through line 823 to a control module 825. If a micro-component does not meet certain minimum standards, a signal is sent from control module 825 to mechanical actuator 827 which activates a micro-component displacement device or arm 829 which is activated to remove the failed micro-component from the stream. A second region of the continuing testing device 801 includes, optionally, electrodes 805 which are excited through leads 807 by power supply 809 to generate a field which excites the plasma gas within the manufactured micro-components. As the micro-components are exited, a luminous output is generated and a second optical detector 811 serves to detect the luminous output and send a signal representing the luminous output for each individual micro-component through line 813 to a second control unit 815. Additionally, with respect to the optional texturizing step after step 660 described above, the continuing testing device 801 can be configured to test the luminous output, i.e., amount and concentration, from the texturized portion of the micro-component.

If no luminous output is detected or a luminous output of less than a predetermined threshold or concentration is detected, the control unit 815 sends a signal to actuator 817 which then actuates a second micro-component displacement device or arm 819 to remove the failed micro-component from the stream.

With respect to the photo-detectors, they are conventional, and can be of the type, for example, which detect UV light. Alternatively, if the micro-component has been coated prior to the end of the fabrication process, for example, with phosphor, the detector may be of the type which is sensitive to a red light output. It should be noted that although the micro-component displacement devices or arms 819 and 829 have been described as mechanical in nature, they may also be non-mechanical, such as an intermittent fluid stream such as a gas or liquid stream or a light pulse such as a high-intensity laser pulse.

Figure 5:
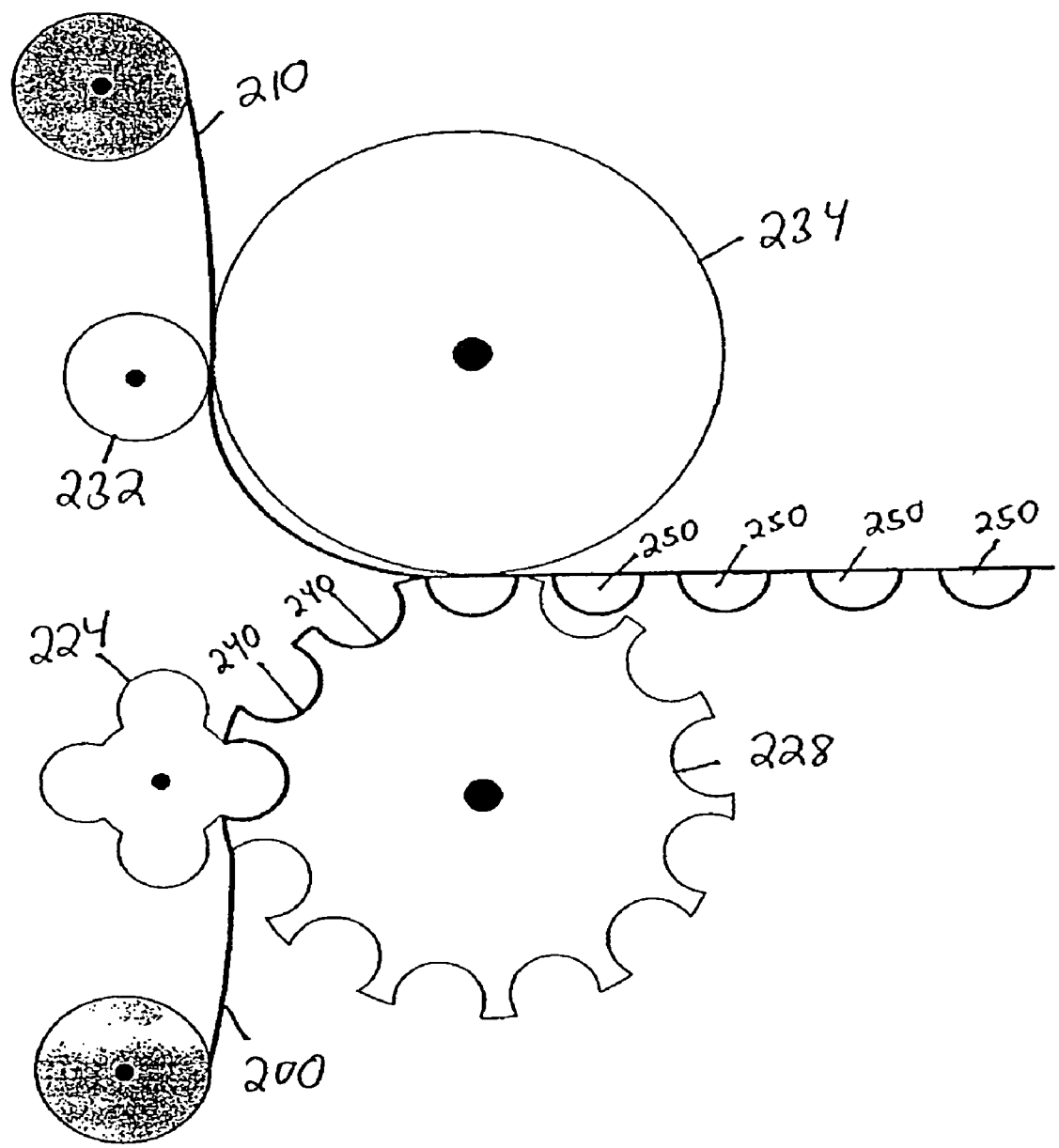
FIG. 5 shows an apparatus used in an embodiment of the present invention as part of another process for forming micro-components.

In another embodiment of the present invention, two substrates are provided, wherein at least one of two substrates contain a plurality of cavities. The two substrates are affixed together in the presence of at least one plasma-forming gas so that when affixed, the cavities are filled with the gas or gas mixture. In an embodiment of the present invention at least one electrode is disposed between the two substrates. In another embodiment, the inside, the outside, or both the inside and the outside of the cavities are coated with at least one coating. It is contemplated that any coating that may be applied to a micro-component as disclosed herein may be used. As illustrated in FIG. 5, one method of making a micro-component in accordance with this embodiment of the present invention is to take a first substrate 200 and a second substrate 210 and then pass the first substrate 200 and the second substrate 210 through a first roller assembly and a second roller assembly, respectively. The first roller assembly includes a first roller with nodules 224 and a first roller with depressions 228. The first roller with nodules 224 is in register with the first roller with depressions 228 so that as the first substrate 200 passes between the first roller with nodules 224 and the first roller with depressions 228, a plurality of cavities 240 are formed in the first substrate 200. As may be appreciated, the cavities may be in the shape desired for micro-components manufactured therewith such as hemispheres, capillaries, cylinders, etc. The second roller assembly, according to a preferred embodiment, includes two second rollers, 232 and 234. The first substrate 200, with a plurality of cavities 240 formed therein, is brought together with the second substrate 210 in the presence of a plasma-forming gas or gas mixture and then affixed, thereby forming a plurality of micro-components 250 integrally formed into a sheet of micro-components. While the first substrate 200 and the second substrate 210 may be affixed by any suitable method, according to a preferred embodiment, the two substrates are thermally affixed by heating the first roller with depressions 228 and the second roller 234.

The nodules on the first roller with nodules 224 may be disposed in any pattern, having even or non-even spacing between adjacent nodules. Patterns may include, but are not limited to, alphanumeric characters, symbols, icons, or pictures. Preferably, the distance between adjacent nodules is approximately equal. The nodules may also be disposed in groups such that the distance between one group of nodules and another group of nodules is approximately equal. This latter approach may be particularly relevant in color light-emitting panels, where each nodule in a group of nodules may be used to form a micro-component that is configured for red, green, and blue, respectively.

Figure 6:
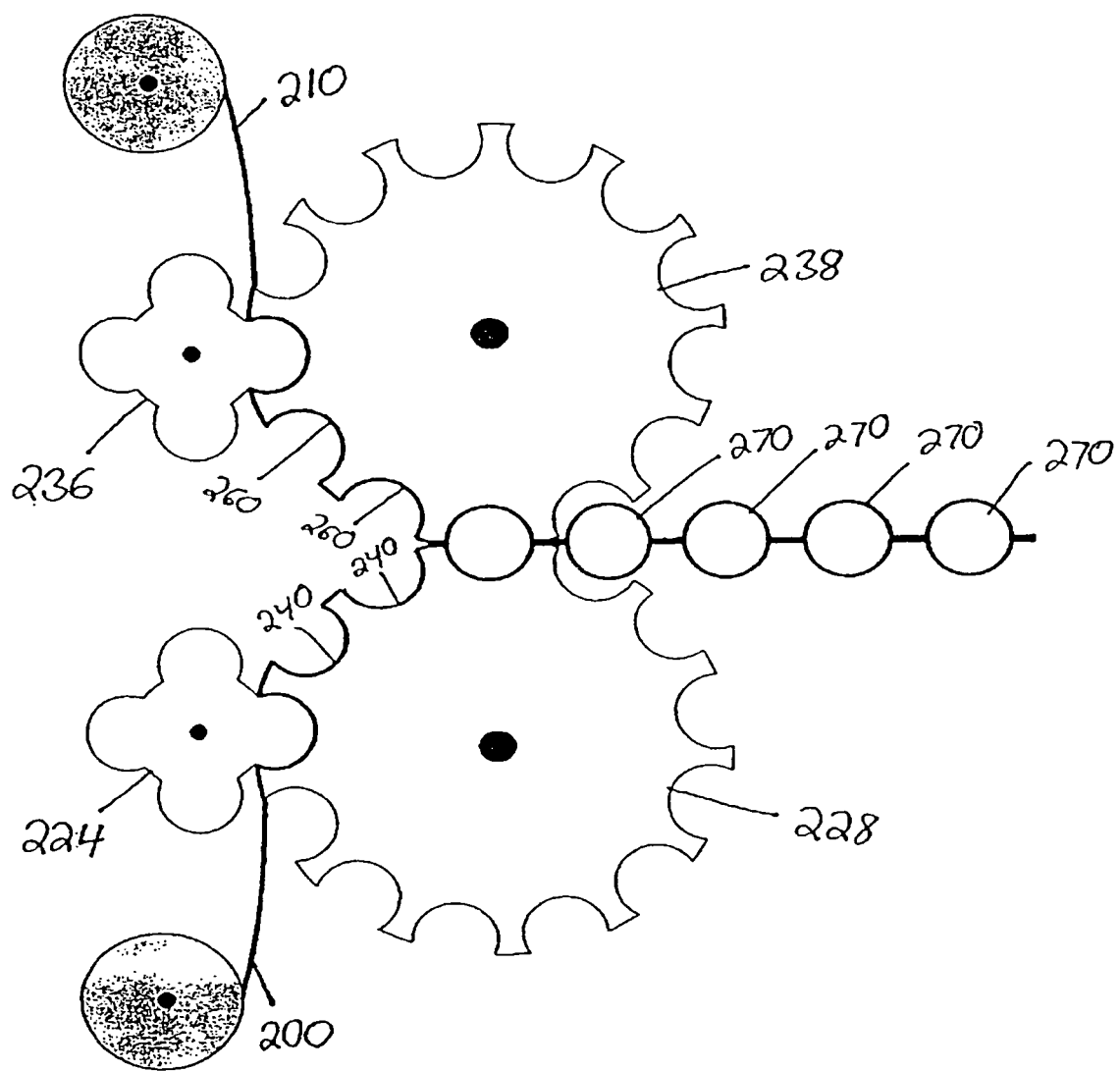
FIG. 6 shows an variation of the apparatus shown in FIG. 5, which is used as part of another process for forming micro-components.

While it is preferred that the second roller assembly simply include two second rollers, 232 and 234, in an embodiment of the present invention as illustrated in FIG. 6, the second roller assembly may also include a second roller with nodules 236 and a second roller with depressions 238 that are in registration so that when the second substrate 210 passes between the second roller with nodules 236 and the second roller with depressions 238, a plurality of cavities 260 are also formed in the second substrate 210. The first substrate 200 and the second substrate 210 are then brought together in the presence of at least one gas so that the plurality of cavities 240 in the first substrate 200 and the plurality of cavities 260 in the second substrate 210 are in register. The two substrates are then affixed, thereby forming a plurality of micro-components 270 integrally formed into a sheet of micro-components. While the first substrate 200 and the second substrate 240 may be affixed by any suitable method, according to a preferred embodiment, the two substrates are thermally affixed by heating the first roller with depressions 228 and the second roller with depressions 238.

In an embodiment of the present invention that is applicable to the two methods discussed above, and illustrated in FIG. 9, at least one electrode 280 is disposed on or within the first substrate 200, the second substrate 240 or both the first substrate and the second substrate. Depending on how the electrode or electrodes are disposed, the electrode or electrodes will provide the proper structure for either an AC or DC (FIG. 7) light-emitting panel. That is to say, if the at least one electrode 280 is at least partially disposed in a cavity 240 or 260 then there will be a direct conductive path between the at least one electrode and the plasma-forming gas or gas mixture and the panel will be configured for D.C. If, on the other hand, the at least one electrode is disposed so as not to be in direct contact with the plasma-forming gas or gas mixture, the panel will be configured for A.C.

Figure 10:
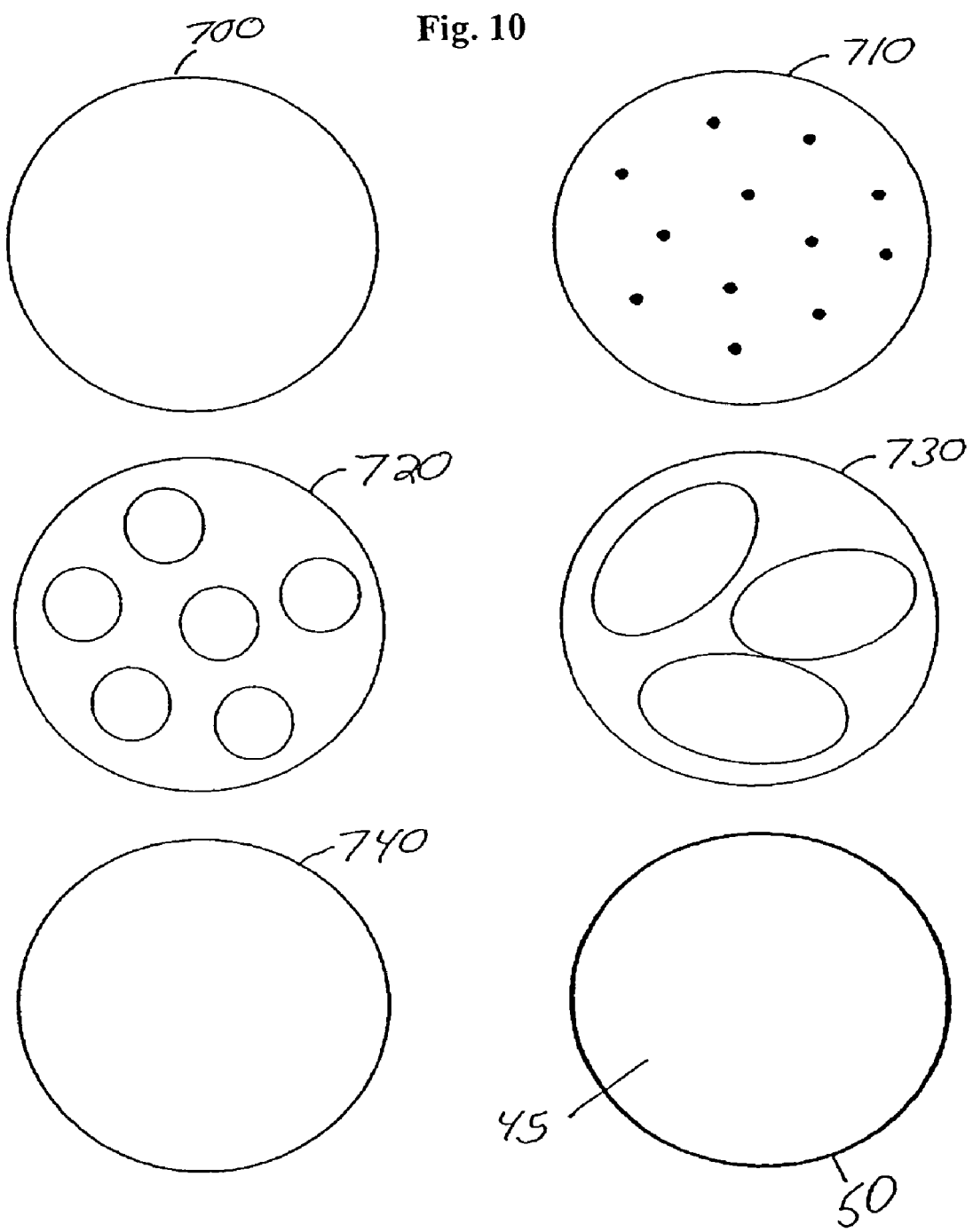
FIG. 10 depicts the steps of another method for forming micro-components.

In another embodiment of the present invention, at least one substrate is thermally treated in the presence of at least one plasma-forming gas, to form a plurality of shells 50 filled with the plasma-forming gas or gas mixture. In a preferred embodiment of the present invention, as shown in FIG. 10, the process for making a micro-component would entail starting with a material or material mixture 700, introducing inclusions into the material 710, thermally treating the material so that the inclusions start forming bubbles within the material 720 and those bubbles coalesce 730 forming a porous shell 740, and cooling the shell. The process is performed in the presence of a plasma-forming gas so that when the shell cools the plasma-forming gas 45 is sealed inside the shell 50. This process can also be used to create a micro-component with a shell doped with a conductive material and/or a secondary emission enhancement material by combining the appropriate dopant with the initial starting material or by introducing the appropriate dopant while the shell is still porous.

In a yet still further method of manufacture, the micro-components can be manufactured using any of the above-mentioned methods, but not in the presence of a plasma-forming gas, and either in a vacuum, air or other atmosphere such as an inert atmosphere. They can be fabricated with one or two openings, and the initial gas inside can be drawn out, for example, through injection of plasma-forming gas through one opening, forcing the gas therein out the other opening. The openings can then be sealed conventionally.

In yet another alternative method, a device having one or more micro-pipettes can create the micro-components much like conventional glass blowing. The gas used to effect the glass-blowing operation can be one of the aforementioned plasma-forming gasses.

In yet still another alternative, an optical fiber extrusion device can be used to manufacture the micro-components. Like an optical fiber, which is solid, the device can be used to extrude a capillary which is hollow on the inside. The capillary can then be cut, filled with plasma-forming gas and sealed.

Figure 7:
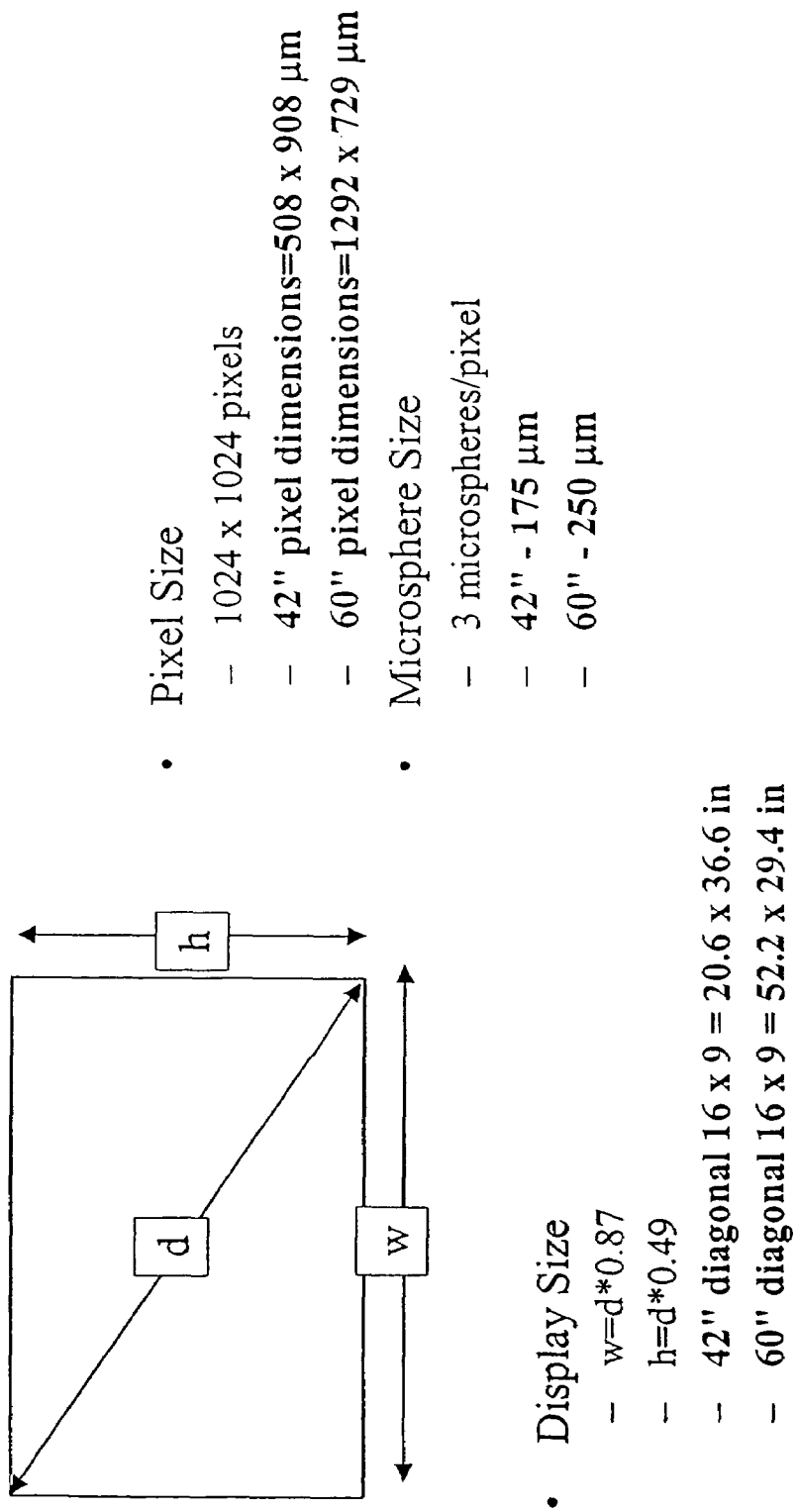
FIG. 7 illustrates an example of selection of pixel size and micro-component (micro-sphere) size for different sized high definition television (HDTV) displays, which can be manufactured according to the micro-component method hereof.

With respect to the selection of materials and dimensions for the micro-components manufactured in the manner described herein, they are manufactured to meet requirements for various standard display resolutions. FIG. 7 illustrates an example of calculation of pixel size and micro-component size, in the case where the micro-components are spheres, for 42-inch and 60-inch high definition television display having a 16:9 aspect ratio. FIG. 8 is a table showing numbers of pixels for various standard display resolutions, and using the process for manufacturing in accordance with the invention herein, such standards can be easily met.

Figure 12:
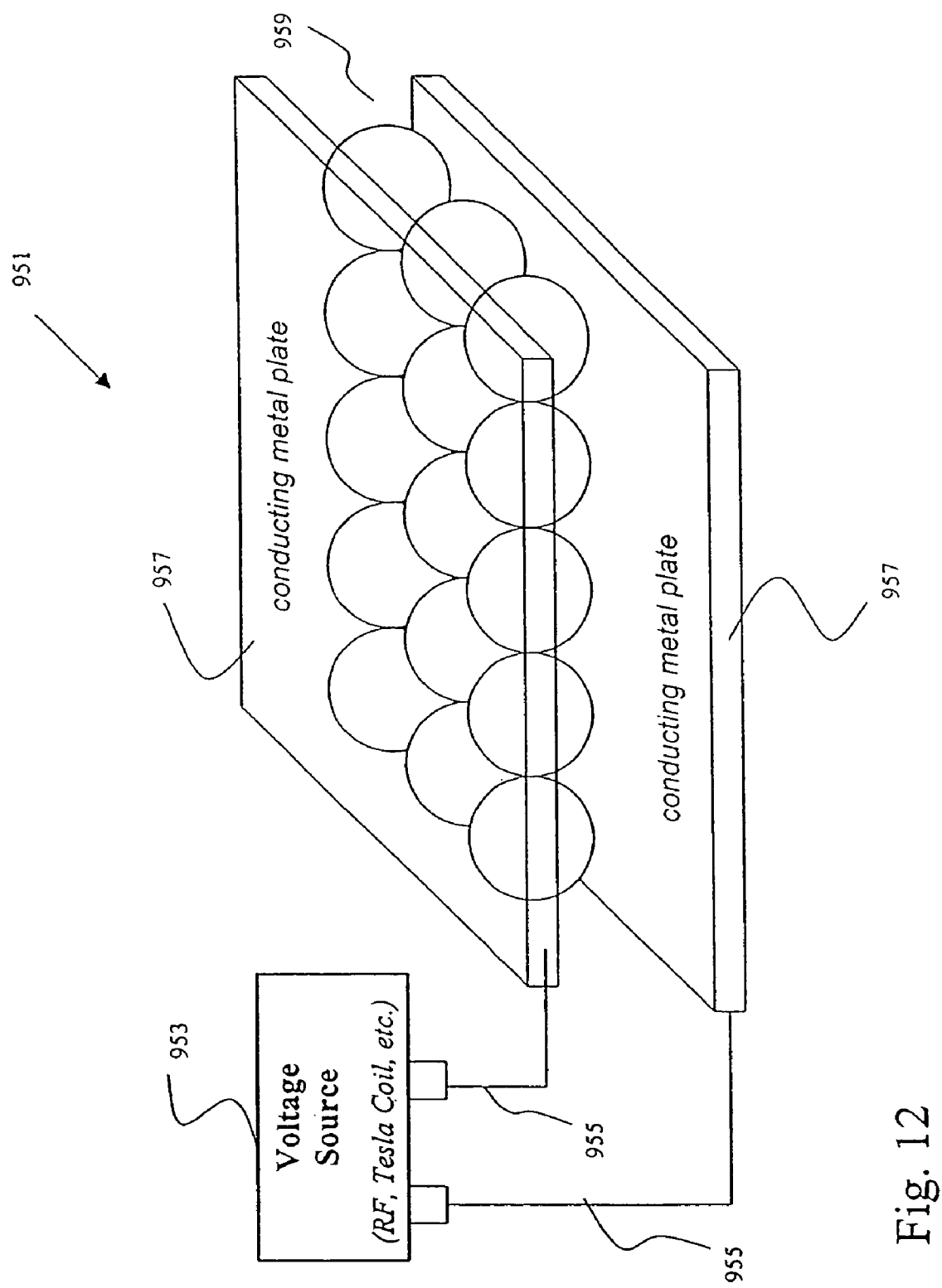
FIG. 12 shows an apparatus used for batch conditioning of micro-components.

In a further aspect, once the micro-components are manufactured, it is desirable to condition them prior to assembly into a plasma display panel. By conditioning is meant exciting them for a time and at an excitation sufficient to cause those micro-components which are likely to fail a short time after assembly in a plasma display panel, to fail prior to assembly. In this manner the yield relative to non-defective micro-components which are eventually assembled into a plasma display panel is significantly increased. Examples of devices for achieving said conditioning are shown in FIGS. 11 and 12. As shown in the conditioning device 951 of FIG. 11 the manufactured and pretested micro-components 959 can be assembled between two conducting metal plates 957 which are powered through leads 955 by a voltage source 953 which can take various forms as illustrated therein. The micro-components 959 are subjected to a field sufficient to excite the plasma gas contained therein, and preferably at a level higher than any excitation level achieved when assembled in a plasma display panel. This is done for a period of time sufficient such that any micro-components which are prone to fail, will fail during the conditioning phase, typically five to ten hours.

Figure 13:
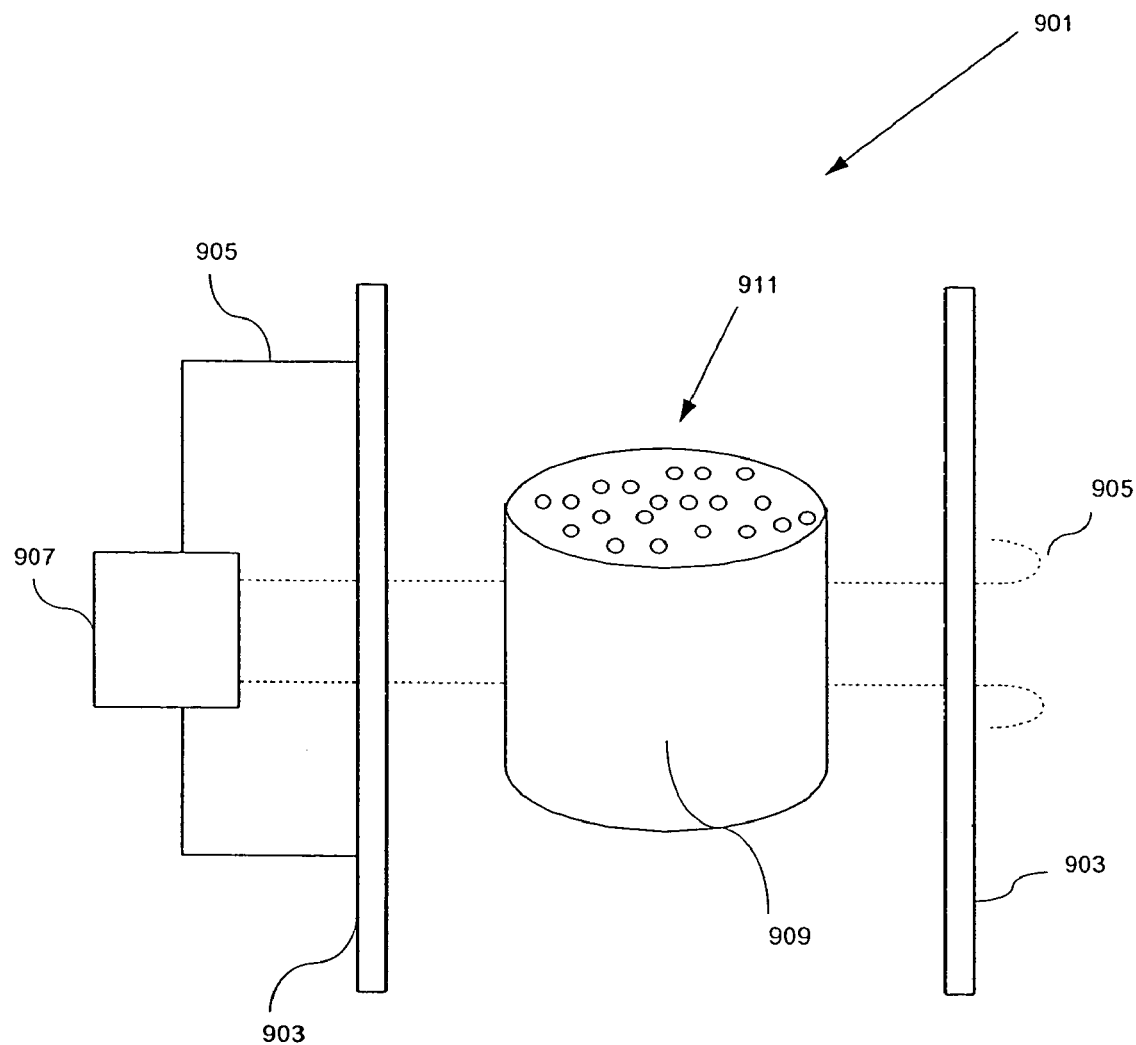
FIG. 13 shows an alternative embodiment of an apparatus used for batch conditioning of micro-components.

As may be appreciated, an alternative system is illustrated by FIG. 13 which shows a conditioning device 901 which further includes a container 909 for confining and containing micro-components 911. The container 909 may be placed between parallel plates or electrodes 903 which are powered through leads 905 by a power source 907 such as a voltage source of the type previously discussed with reference to FIG. 11. The advantage of such a system is that by having container 909, the micro-components are easily contained. After the conditioning period, the individual micro-components can then be dropped through a system such as pre-testing device 801 shown in FIG. 11 without the presence of manufacturing drop tower 600, and tested previously described for the method during which the micro-components are assembled. In this manner, those micro-components which failed the conditioning are eliminated and only fully-functioning micro-components can then be assembled into a plasma display panel as heretofore described.

Figure 9:
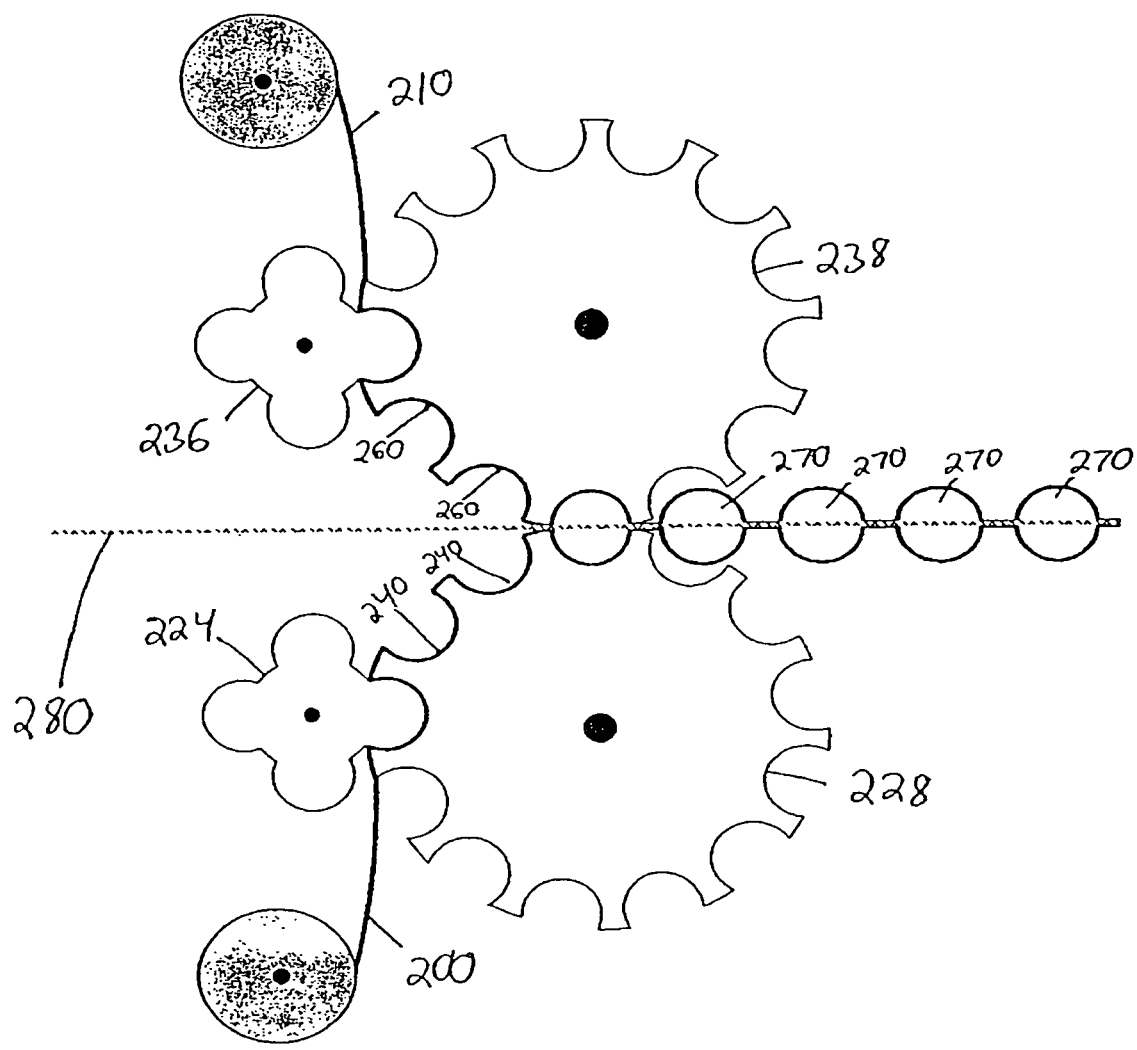
FIG. 9 illustrates, according to an embodiment, one way in which an electrode may be disposed between two substrates as part of a process for forming micro-components.

With respect to micro-components manufactured as discussed with reference to FIGS. 5, 6, and 9, once assembled, they may be cut from the sheets on which they are formed. They can be pretested with a device such as shown in the lower half of FIG. 11 at 801 and 803. They can then be pre-conditioned as previously described with reference to FIGS. 12 and 13, and then retested with the device of the lower half of FIG. 11 at 801 and 803.

Other embodiments and uses of the present invention will be apparent to those skilled in the art from consideration of this application and practice of the invention disclosed herein. The present description and examples should be considered exemplary only, with the true scope and spirit of the invention being indicated by the following claims. As will be understood by those of ordinary skill in the art, variations and modifications of each of the disclosed embodiments, including combinations thereof, can be made within the scope of this invention as defined by the following claims.

What is claimed is:

1. A process for forming a light-emitting micro-component, comprising:
   forming a shell of predetermined shape and encapsulating therein a plasma-forming gas to thereby form a micro-component; and
   texturing a portion of the micro-component to form a texturized portion, wherein upon application of an electrical signal, the micro-component is caused to emit light through the texturized portion.

2. The process of claim 1, wherein texturizing a portion of the micro-component is achieved by sandblasting the shell of the micro-component.

3. The process of claim 1, wherein texturizing a portion of the micro-component is achieved by etching the shell of the micro-component.

4. The process of claim 1, wherein texturizing a portion of the micro-component is achieved through lithography.

5. The process of claim 1, wherein the texturized portion is approximately 10 to 100 microns in diameter, depending on the diameter of the micro-component.

6. The process of claim 1, further comprising doping the shell of the micro-component with a rare earth material.

7. The process of claim 6, wherein the rare earth material is selected from the group consisting of europium 2+ for blue, europium 3+ for red, cerium 3+ for violet, and cerium 3+ plus terbium 3+ for green.

8. The process of claim 1, wherein the plasma-forming gas is a rare gas halide mixture.

* * * * *